(12) United States Patent
Totani et al.

(10) Patent No.: US 7,172,209 B2
(45) Date of Patent: Feb. 6, 2007

(54) HEAD-PROTECTING AIRBAG DEVICE

(75) Inventors: Chiharu Totani, Aichi (JP); Masayasu Okada, Aichi (JP); Toshinori Tanase, Aichi (JP)

(73) Assignee: Toyoda Gosei Co., Ltd., Aichi-ken (JP)

( * ) Notice: Subject to any disclaimer, the term of this patent is extended or adjusted under 35 U.S.C. 154(b) by 335 days.

(21) Appl. No.: 10/932,307

(22) Filed: Sep. 2, 2004

(65) Prior Publication Data

US 2005/0046160 A1    Mar. 3, 2005

(51) Int. Cl.
*B60R 21/213* (2006.01)
*B60R 21/215* (2006.01)

(52) U.S. Cl. ............... 280/728.2; 280/728.3; 280/730.2

(58) Field of Classification Search ............. 280/728.2, 280/728.3, 730.2
See application file for complete search history.

(56) References Cited

U.S. PATENT DOCUMENTS

| 6,173,990 | B1 * | 1/2001 | Nakajima et al. | 280/730.2 |
| 6,333,515 | B1 * | 12/2001 | Kubota et al. | 280/730.2 |
| 6,460,879 | B2 * | 10/2002 | Tanase et al. | 280/730.2 |
| 2004/0075250 | A1 * | 4/2004 | Choi | 280/728.3 |
| 2005/0052001 | A1 * | 3/2005 | Totani et al. | 280/728.2 |

FOREIGN PATENT DOCUMENTS

JP    A2001-334902    12/2001

\* cited by examiner

*Primary Examiner*—Paul Dickson
*Assistant Examiner*—Laura B. Rosenberg
(74) *Attorney, Agent, or Firm*—Posz Law Group, PLC

(57) ABSTRACT

An airbag of the head-protecting airbag device according to the present invention pushes and opens a door portion in a lower edge of an airbag cover, when fed with inflation gas, and protrudes for covering side windows. An assist grip is located in an arrangement area of the airbag cover. The assist grip is secured to vehicle body together with the airbag cover at its fixing portions located in both ends of its grip portion. The airbag cover is provided around each of portions fixed to the vehicle body together with the fixing portions with a breakable portion. When pushed by the inflating airbag, the breakable portion is broken to shift a portion of the airbag cover located toward the door portion inward of the vehicle.

9 Claims, 25 Drawing Sheets

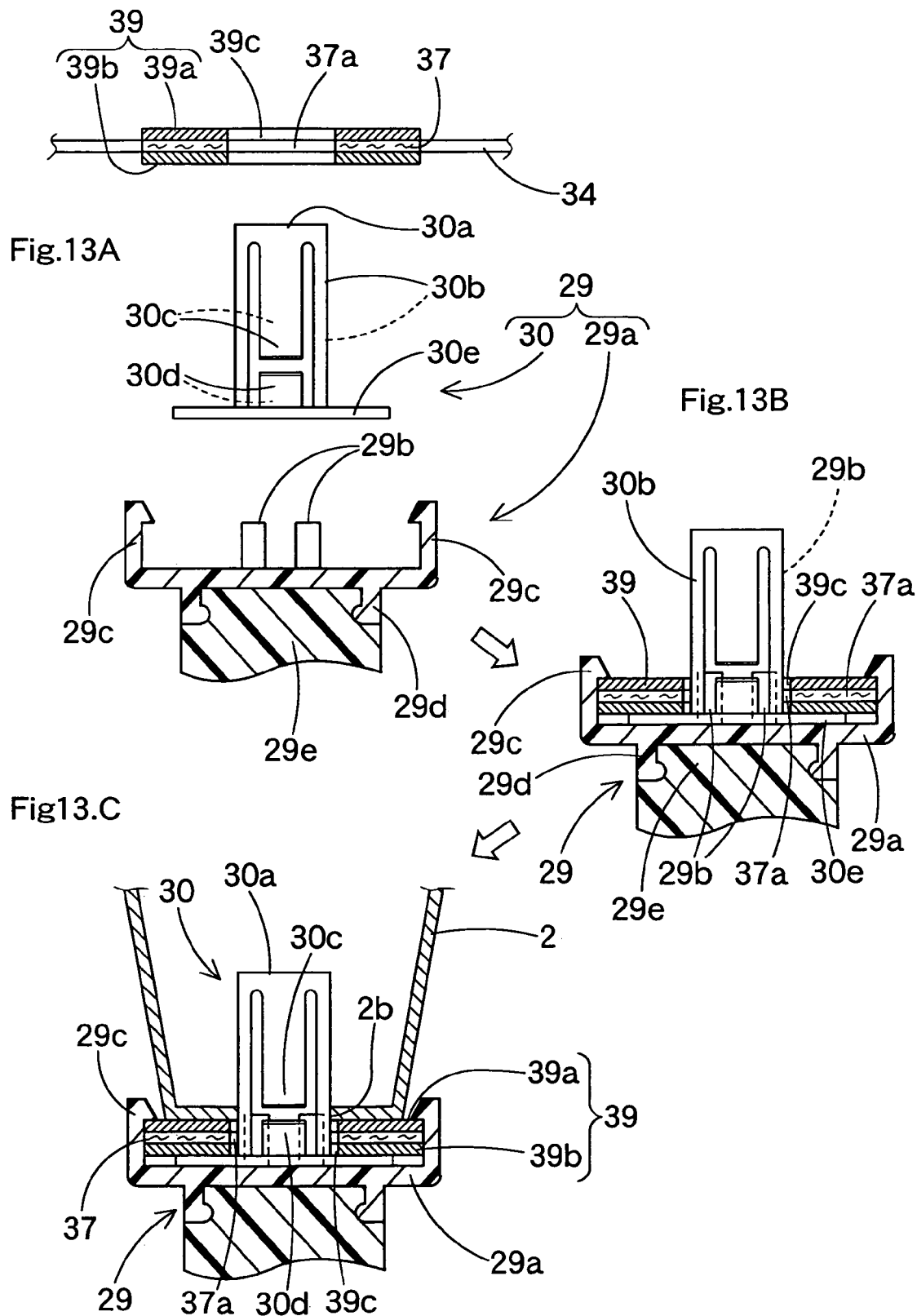

HEAD-PROTECTING AIRBAG DEVICE

Japanese Patent Application No. 2003-178105 of Totani et al, filed on Jun. 23, 2003, and Japanese Patent Application No. 2004-131372 of Totani et al, filed on Apr. 27, 2004, the disclosures of which are hereby incorporated into the present application by reference.

BACKGROUND OF THE INVENTION

1. Field of the Invention

The present invention relates to a head-protecting airbag device mountable on an automobile, and more particularly, relates to a head-protecting airbag device including an airbag which is arranged along upper edges of side windows inside a vehicle while being covered by an airbag cover, and an assist grip which is arranged in an arrangement area of an airbag cover.

2. Description of Related Art

A conventional head-protecting airbag device of this kind arranges a folded airbag along upper edge of side windows inside a vehicle. The folded airbag is covered at the interior side with an airbag cover, and the airbag cover is provided in a lower edge part with a door portion that is pushed open by the inflating airbag, as disclosed in Japanese Laid-Open Patent Application No. 2001-334902. Assist grips are located in the arrangement area of the airbag cover.

The assist grip is provided at both ends of its grip portion with fixing portions for fixation to the vehicle body. Each of the fixing portions also fixes the airbag cover to the vehicle body to reduce fixing means of the airbag cover to the vehicle body.

That is, since the fixing portions press a part of the airbag cover onto the vehicle body, it was liable that an opening of the door portion of the airbag cover is limited by the fixing portions when the door portion is pushed open by the inflating airbag.

SUMMARY OF THE INVENTION

The present invention contemplates to solve the above-mentioned problem, and therefore, has an object to provide a head-protecting airbag device which assures an enlarged opening of a door portion of an airbag cover for an airbag to deploy from, even if fixing portions of an assist grip secure the airbag cover to a vehicle body.

The object of the present invention is achieved by a head-protecting airbag device including:

an airbag folded and housed in upper periphery of side windows inside a vehicle, the airbag being deployable to cover the side windows when fed with inflation gas;

an airbag cover for covering a vehicle's interior side of the folded airbag, the airbag cover including a door portion openable upon airbag deployment in a lower edge thereof; and an assist grip located in an arrangement area of the airbag cover, the assist grip including a grip portion and fixing portions located at both ends of the grip portion, wherein:

the assist grip is secured to vehicle body together with the airbag cover at the fixing portions;

the airbag cover is provided around each of portions fixed to the vehicle body together with the fixing portions of the assist grip with a breakable portion:

whereby, when pushed by the inflating airbag, the breakable portion is broken to shift a portion of the airbag cover located toward the door portion inward of the vehicle.

In the head-protecting airbag device of the present invention, the airbag cover pushed by the inflating airbag breaks the breakable portion, and shifts its portion including the door portion inward of the vehicle while leaving its portion fixed by the fixing portions of the assist grip remaining in the vehicle body. Accordingly, an opening of the door portion is enlarged compared with a case where the door portion only opens.

After the breakable portion is broken, the portion including the door portion is blocked by the grip portion of the assist grip fixed to the vehicle body at the fixing portions, and therefore, is prevented from excessively projecting inward.

Therefore, the head-protecting airbag device of the present invention assures an enlarged opening of the door portion of the airbag cover for smooth deployment of the airbag, even if the fixing portions of the assist grip secure the airbag cover to the vehicle body.

It will also be appreciated that the airbag device further includes a functional part secured to the vehicle body together with the airbag cover and located between the fixing portions of the assist grip, that the breakable portion is arranged from outer edges of the fixing portions of the assist grip to a lower edge of the functional part, so that the breakable portion has a substantially U shape as viewed from the inner side.

With this construction, the airbag cover breaks the breakable portion and opens the door portion upon deployment of the airbag, while leaving its portions fixed by the functional part remaining fixed to the vehicle body. Even if the functional part is located in the airbag cover, therefore, the head-protecting airbag device of the present invention assures an enlarged opening of the door portion of the airbag cover upon airbag deployment, and the airbag deploys smoothly.

Moreover, the functional part is located only between the fixing portions of the assist grip, and accordingly, a peripheral portion of the assist grip is free of other components but the airbag cover. Therefore, appearance around the assist grip is improved as viewed from the interior.

The head-protecting airbag device of the present invention may be provided with more than one assist grips located along front-rear direction of the vehicle. In that case, the functional part is located in at least one of the assist grips.

The airbag cover employed in the present invention is desirably constituted by a roof side rail garnish arranged along front-rear direction in a band shape in a roof side rail of the vehicle between side windows and a roof head lining, separately from the roof head lining.

If the airbag cover is constituted by a roof side rail garnish, the airbag cover is desirably constructed of more than one parts split up in the front-rear direction of the vehicle.

Moreover, the airbag cover may be a part of a roof head lining.

BRIEF DESCRIPTION OF DRAWINGS

FIGS. 13A, 13B, and 13C are sectional views illustrating the attachment process of the airbag module in FIG. 11 to the vehicle, taken along line XIII—XIII in FIG. 11;

DESCRIPTION OF PREFERRED EMBODIMENTS

Preferred embodiments of the present invention are described below with reference to the accompanying drawings. However, the invention is not limited to the embodiments disclosed herein. All modifications within the appended claims and equivalents relative thereto are intended to be encompassed in the scope of the claims.

Figure 1:
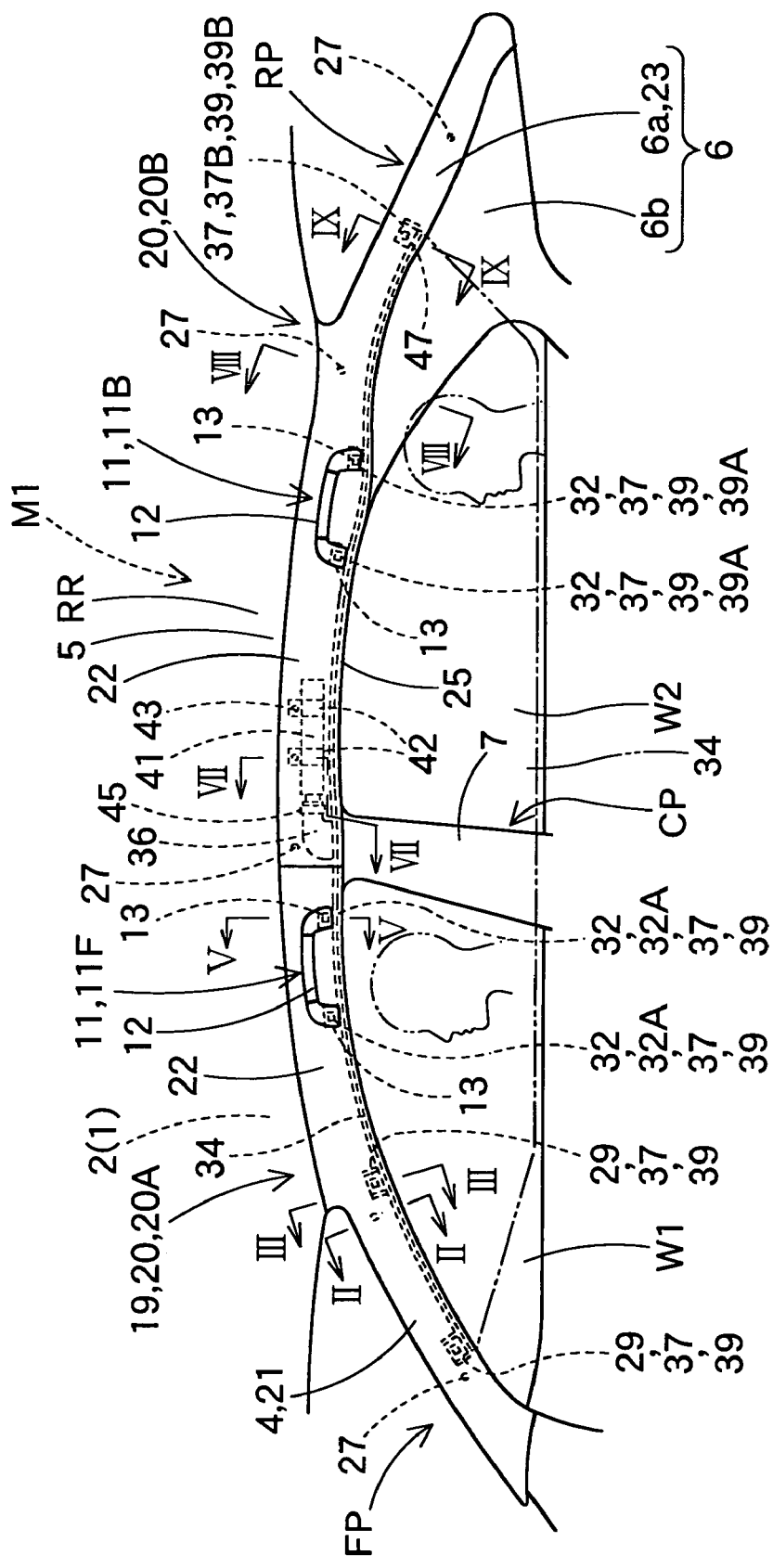
FIG. 1 is a front view of a first embodiment of the head-protecting airbag device according to the present invention, as viewed from the vehicle's interior.

Referring to FIG. 1, a first embodiment of the head-protecting airbag device M1 according to the present invention locates a folded airbag 34 elongatively along upper edges of side windows W1 and W2 inside the vehicle, from a front pillar FP to an upper part of a rear pillar RP, via a roof side rail RR above a center pillar CP or a middle pillar.

Relationships of up-down, front-rear, and left-right in this specification are based on a state of the head-protecting airbag device M1 mounted on a vehicle, and therefore, correspond to up-down, front-rear, and left-right of the airbag device mounted on a vehicle.

The head-protecting airbag device M1 includes an airbag 34, an inflator 41, mounting brackets 39, an airbag cover 19, and assist grips 11.

Figure 10:
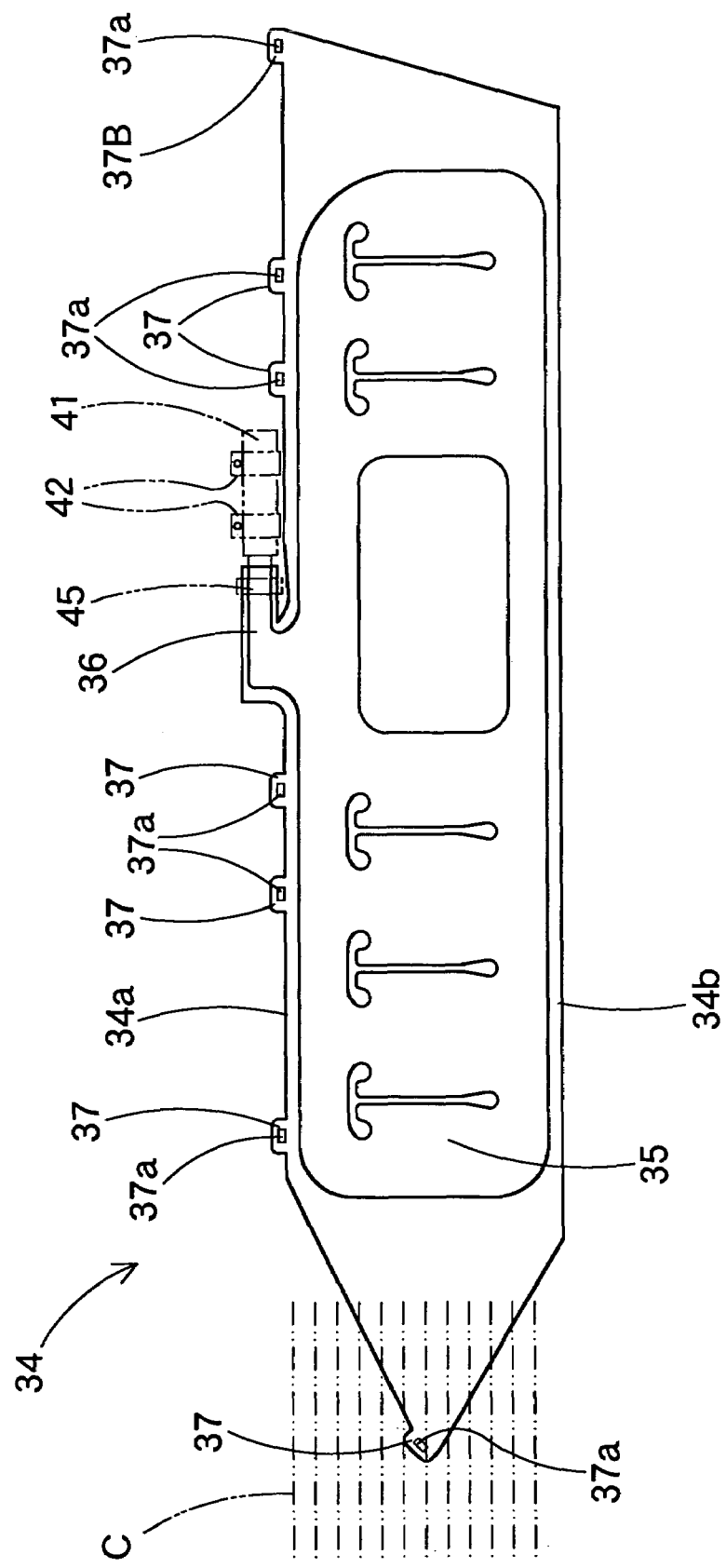
FIG. 10 is a front view of an airbag used in the airbag device in FIG. 1, as flatly expanded.

The airbag 34 is formed by hollow-weaving method of polyamide, polyester yarns or the like, and includes a gas admissive portion 35 which has a substantially rectangular sheet shape and inflates with inflation gas from the inflator 41, as shown in FIGS. 1 and 10. The airbag 34 is provided along its upper edge 34a with a plurality of mounting portions 37 for attachment of the airbag 34 to the vehicle body 1. The airbag 34 is further provided in the middle of the front-rear direction of the gas admissive portion 35 with a tubular joint port 36 extending upward and bent to be joined with the inflator 41.

Each of the mounting portions 37 is provided with a rectangular mounting hole 37a, and a mounting bracket 39 is attached thereto. As shown in FIGS. 4, 6, 11, 13 to 15, each of the mounting brackets 39 consists of two substantially rectangular plates of sheet metal, i.e., an outer and inner plates 39a and 39b which are located at the inner side I and the outer side O of the mounting portion 37, respectively. Each of the plates 39a and 39b has a through hole 39c shaped correspondingly to the mounting hole 37a. The plates 39a and 39b are fixed to each of the mounting portions 37 by being plastically deformed to protrude partially either toward interior or exterior with the mounting portion 37 put therebetween. Each of the mounting portions 37 is then secured to the inner panel 2 utilizing later-described retaining pieces 15 or 30 which are respectively put through the mounting hole 37a and the through hole 39c to be held by a mounting hole 2b or 2c formed in the inner panel 2 of the vehicle body 1. A mounting portion 37B and a mounting bracket 39B located in the rear end part are secured to the inner panel 2 utilizing a mounting bolt 47.

The retaining pieces 15 and 30 also serve to attach the airbag cover 19 to the inner panel 2, and the retaining piece 15 further serves to secure the assist grips 11 to the inner panel 2.

Figure 9:
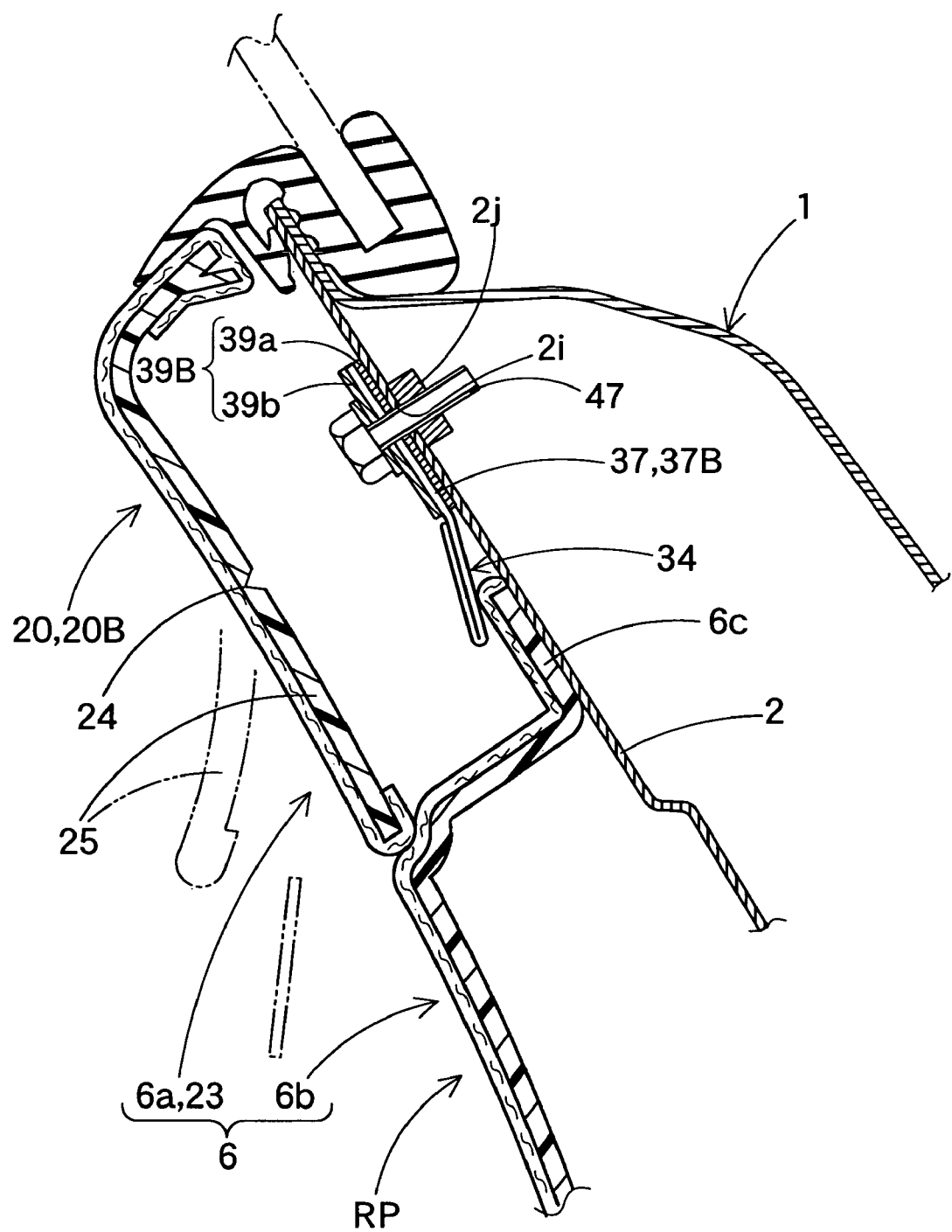
FIG. 9 is a sectional view taken along line IX—IX in FIG. 1.
Figure 11:
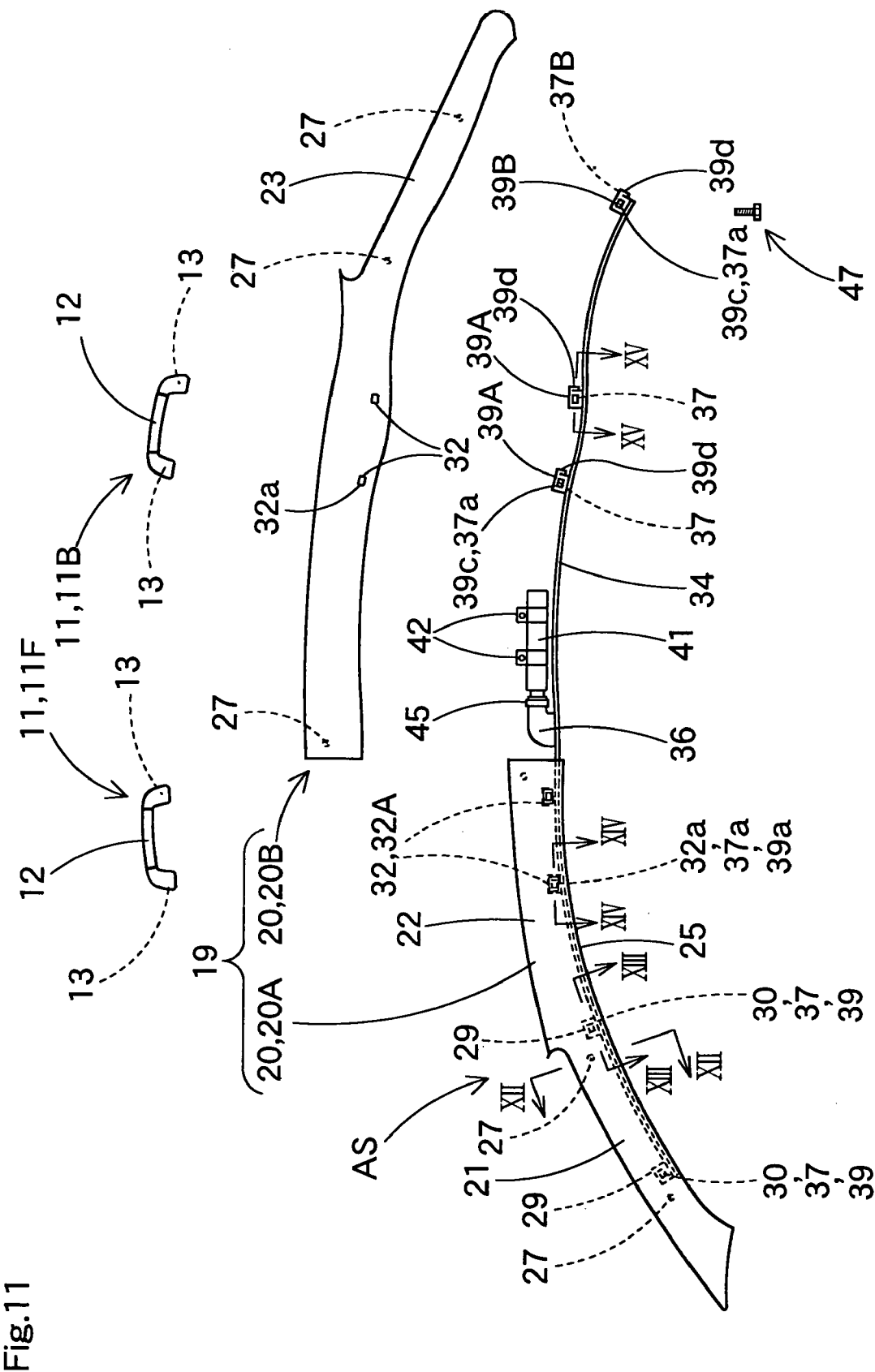
FIG. 11 is front views of an airbag module of the airbag device in FIG. 1 and other major components.
Figure 15A:
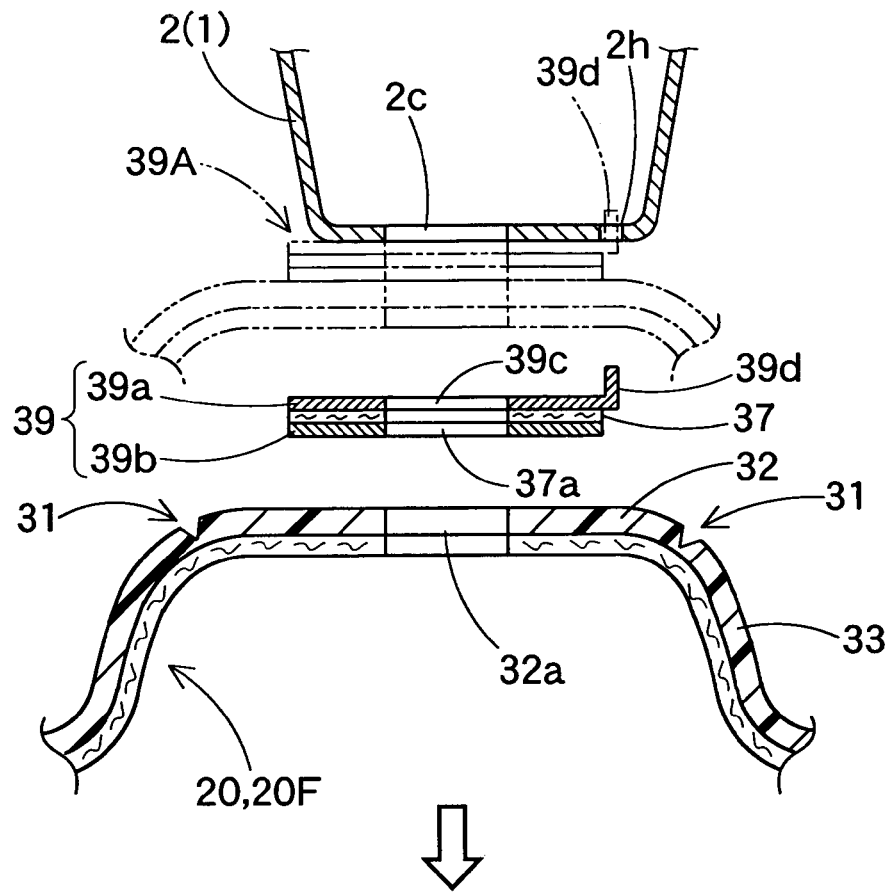
FIGS. 15A and 15B are sectional views illustrating the attachment process of the airbag module in FIG. 11 to the vehicle, taken along line XV—XV in FIG. 11.
Figure 15B:
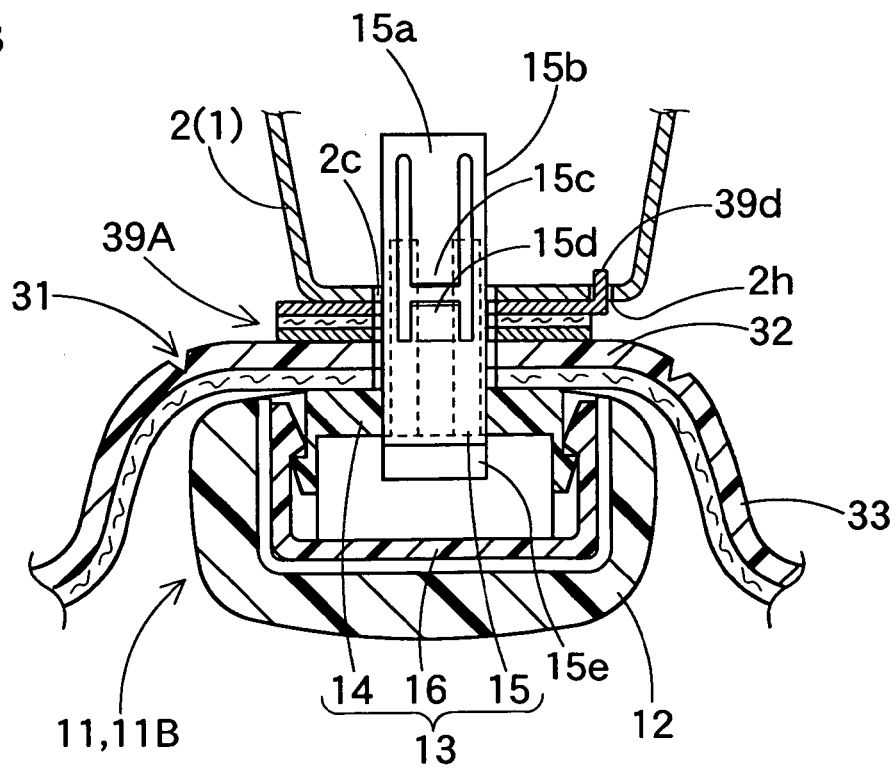
Figure 16:
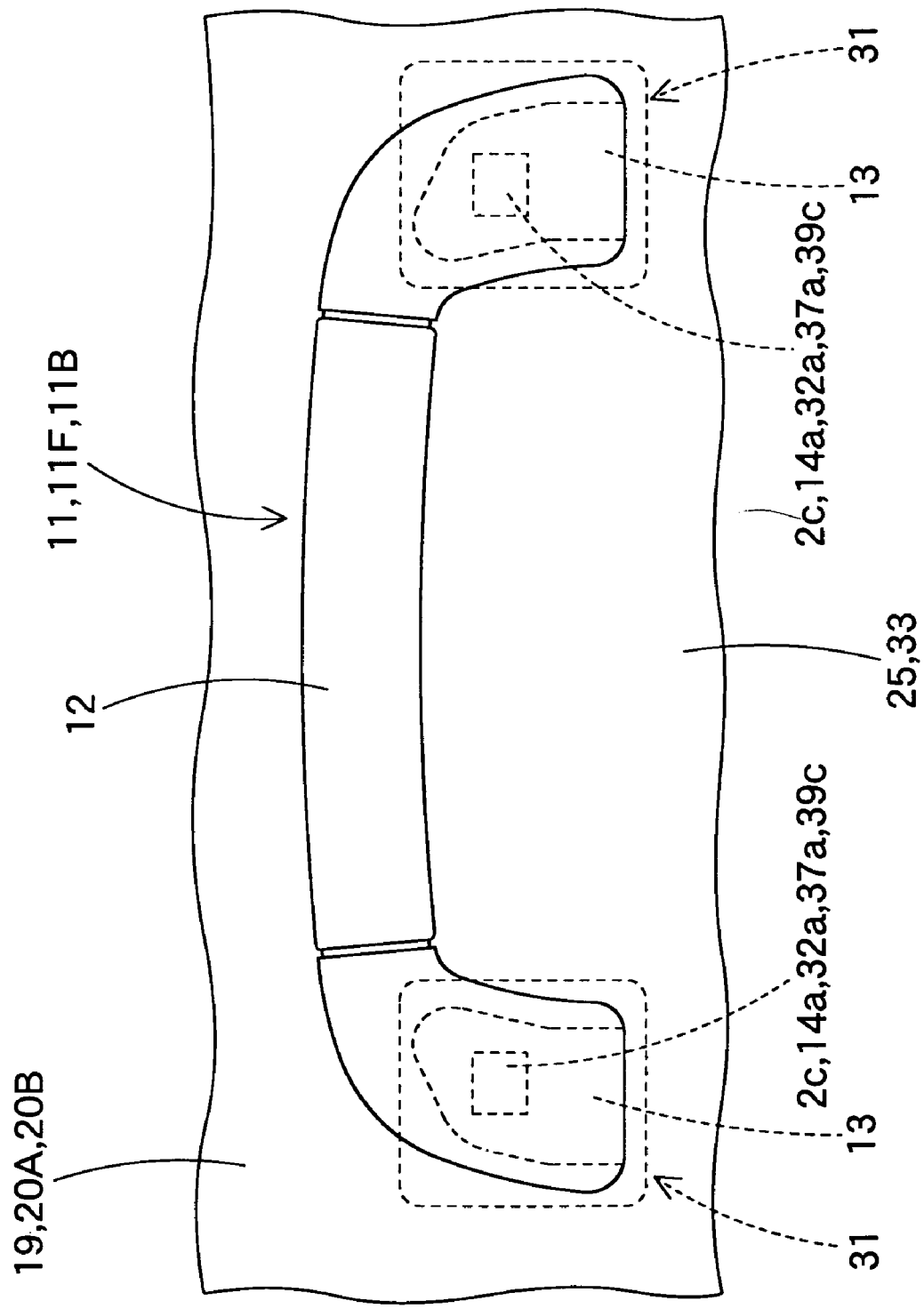
FIG. 16 is an enlarged front view of the assist grip in the first embodiment and a portion therearound.

As shown in FIGS. 11 and 15, two mounting brackets 39 (39A) of a rear assist grip 11B and the rearmost mounting bracket 39 (39B) are each provided with a hook 39d to be hooked by a mounting hole 2h located in the vicinity of a mounting hole 2c or a mounting hole 2i (refer to FIG. 9) in the inner panel 2. The rearmost bracket 39B is secured to the vehicle body 1 together with the mounting portion 37B by the mounting bolts 47 which is fastened into a nut 2j arranged in the mounting hole 2i, as shown in FIG. 9.

As shown in FIGS. 1, 7, 10 and 11, the inflator 41 is joined with the joint port 36 of the airbag 34 by a clamp 45, and is secured to the inner panel 2 as a member of the vehicle body 1 by mounting brackets 42 of sheet metal. Each of the mounting brackets 42 is adapted to clamp the inflator 41, and is secured to the inner panel 2 by screwing a bolt 43 into a nut 2e formed in the mounting hole 2d of the inner panel 2.

Referring to FIGS. 1, 5, 6, & 14 to 17, the assist grips 11 (11F and 11B) are located in the interior I of a roof side rail RR in the upper periphery of side windows W1 and W2, i.e., in the arrangement area of the airbag cover 19. Each of the assist grips 11 includes an inversed-U shaped grip portion 12 for a vehicle occupant to hand-grip, and fixing portions 13 located in front and rear ends of the grip portion 12. Each of the fixing portions 13 includes a base 14, a retaining piece 15 and a cap 16. The base 14 is rotatably joined with an end of the grip portion 12 by a hinge mechanism 17. The hinge mechanism 17 is constructed such that its part located in one of the two fixing portions 13 of the assist grip 11 includes a damper mechanism, and the other part located in the other fixing portion 13 includes a spring member for helping the grip portion 12 to restore after turning. The grip portion 12, when in service, is pulled out toward the interior I by turning it around the position of the hinge mechanism 17, as indicated by double-dotted lines in FIG. 5.

Figure 6:
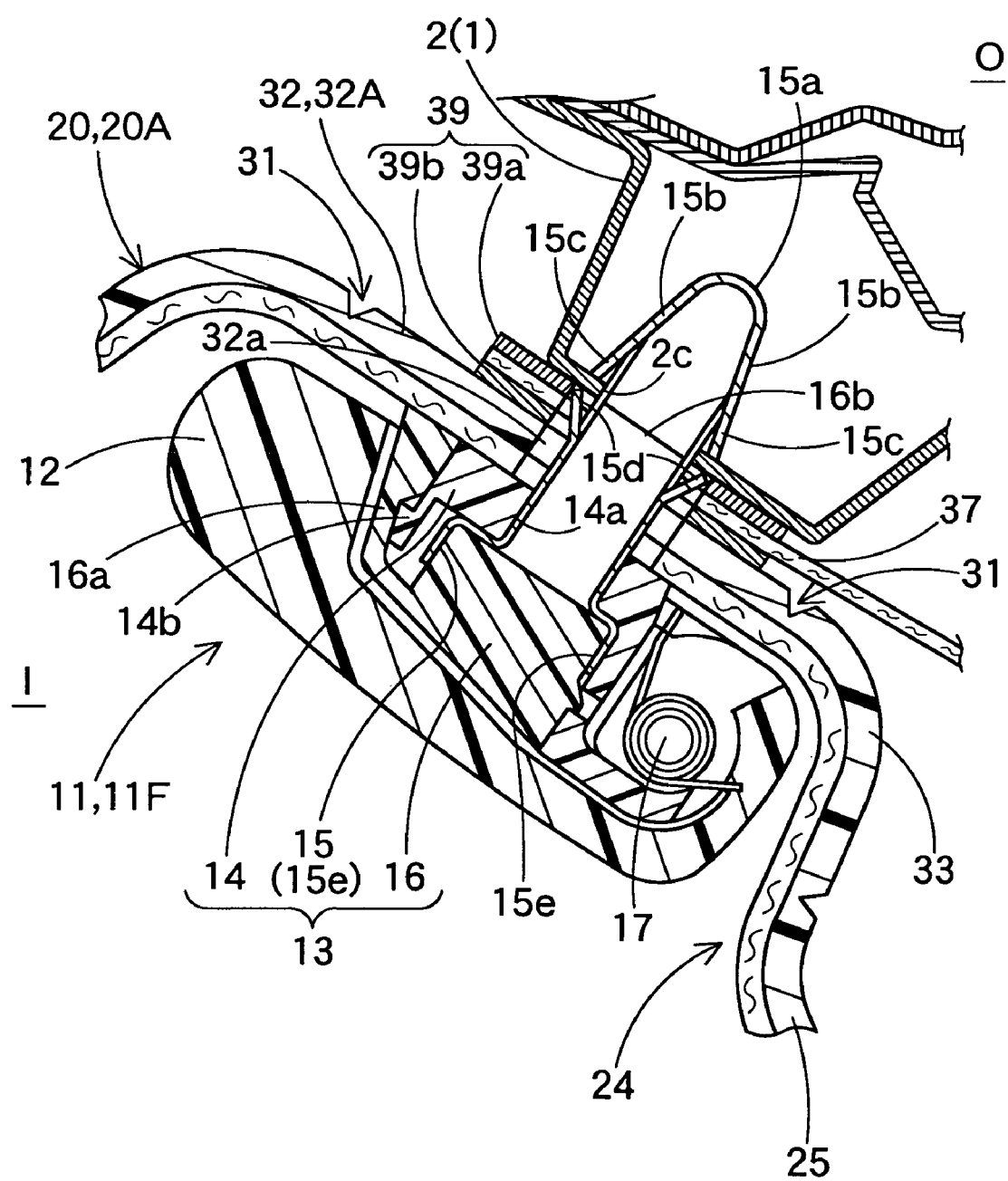
FIG. 6 is an enlargement of FIG. 5 showing the vicinity of an assist grip.
Figure 14A:
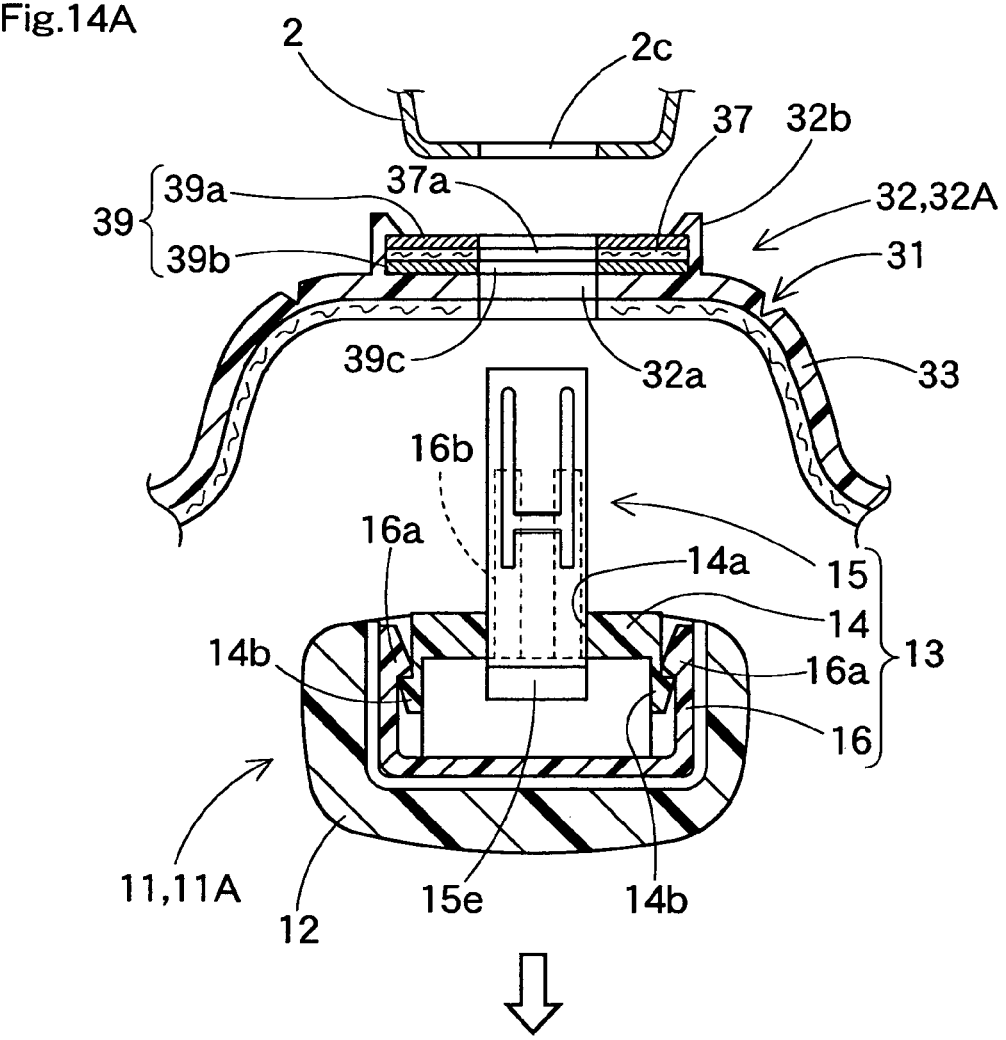
FIGS. 14A and 14B are sectional views illustrating the attachment process of the airbag module in FIG. 11 to the vehicle, taken along line XIV—XIV in FIG. 11.
Figure 14B:
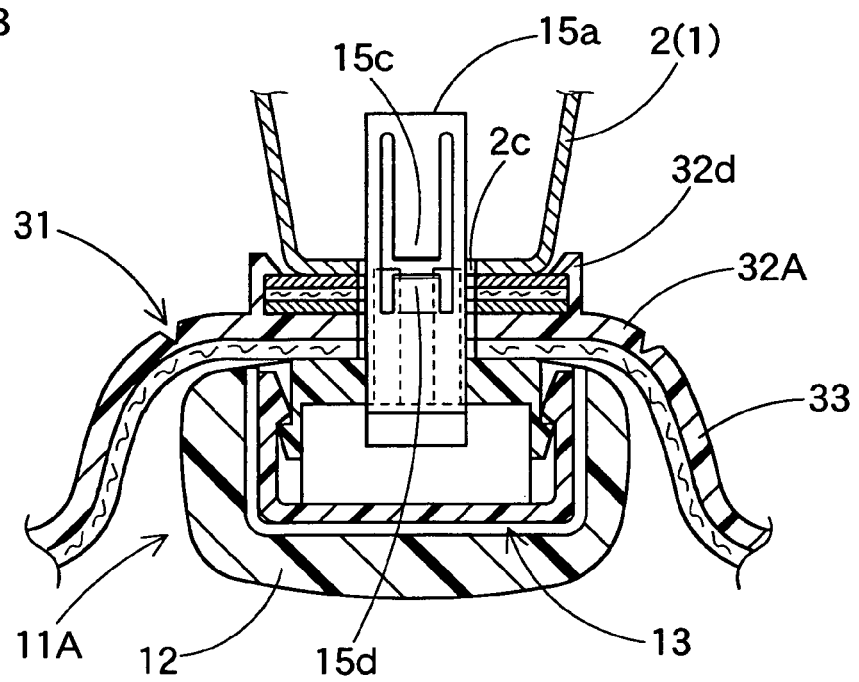

Referring to FIGS. 6 and 14, the base 14 is made from synthetic resin, and includes a hole 14a which opens in a rectangular shape through in the interior-exterior direction. The hinge mechanism 17 is located at a lower end of the base 14. The retaining piece 15 is put through the through hole 14a. In the interior I of the base 14 are provided with a plurality of retaining pawls 14b for retaining the cap 16.

The cap 16 made from synthetic resin is exposed in the vehicle's interior I when the grip portion 12 is turned and pulled out. The cap 16 includes an engaging portion 16a to be engaged with the retaining pawls 14b of the base 14, and a spacer 16b to be inserted in between side walls 15b of the retaining piece 15 upon engagement with the base 14. The spacer 16b is adapted to prevent the side walls 15b of the retaining piece 15 from approaching each other, and to stabilize the fixation of the retaining piece 15 to the inner panel 2.

The retaining piece 15 is formed by bending a spring sheetmetal to have a substantially U-shaped section with its leading end 15a rounded, and is bifurcated from the leading end 15a into the side walls 15b. Each of the side walls 15b includes a retaining projection 15c which is raised by cutwork to project outwardly, and a holding projection 15d which is also raised outwardly by cutwork to confront an interior end of the retaining projection 15c. When the retaining piece 15 is inserted into the mounting hole 2c of the inner panel 2, the retaining projections 15c are once deformed to pass through the mounting hole 2c, and then spring back such that the periphery of the mounting hole 2c is positioned between the retaining projections 15c and the holding projections 15d. Consequently, the retaining piece 15 is secured to the inner panel 2 tightly by being suppressed from moving toward the interior I or exterior O. Ends 15e of the retaining piece 15 in the interior side I are adapted to serve as a grip portion for gripping when pulling the retaining piece 15 out of the mounting hole 2c such that the side walls 15b approach each other to shift the retaining projections 15c into the mounting hole 2c from the periphery of the mounting hole 2c.

To bring the side walls 15b close to each other to remove the retaining piece 15 from the inner panel 2, the cap 16 is removed such that the spacer 16b of the cap 16 positioned between the side walls 15b is pulled out of the space between the side walls 15b. By then removing the retaining piece 15, the assist grip 11 is detached, so that the airbag cover 19 (or a later-described split part 20) and the airbag 34 are detached from the inner panel 2.

Referring to FIGS. 1 and 11, the airbag cover 19 is located between a roof head lining 5 and side windows W1 and W2, and serves as a roof side rail garnish prepared separately from the roof head lining 5. In the illustrated embodiment, the airbag cover 19 is located extendedly along upper periphery of side windows W1 and W2 inside the vehicle, from the front pillar FP to an upper part and rear edge of the rear pillar RP, via the roof side rail RR above the center pillar CP or a middle pillar. As shown in FIGS. 2, 3, 5, and 7 to 9, the airbag cover 19 is made from synthetic resin such as PC (polycarbonate)/ABS (Acrylonitrile butadiene styrene), polypropylene with filler, or thermoplastic elastomer of olefin, with a skin, and is provided entirely along its lower edge with a door portion 25 that is pushed open by the airbag 34 upon deployment. Along an upper edge of the door portion 25 is a thinned hinge line 24 for helping easy opening of the door portion 25. Although the illustrated embodiment shows the cover 19 having a skin on surface, the cover maybe constructed without a skin.

In the illustrated embodiment, the airbag cover 19 consists of two split parts 20 (20A and 20B) that are split up in the front-rear direction. The split parts 20A and 20B are split up generally above the center pillar CP. The split part 20A includes a front pillar garnish portion 21 for covering an entire area of the interior side I of the front pillar FP, and a roof side rail portion 22 that extends rearward from an upper part of the front pillar FP in the roof side rail RR inside the vehicle. The split part 20B includes a roof side rail portion 22 extending rearward continuously from the part 20A in the interior I of the roof side rail RR, and a rear pillar garnish portion 23 arranged up to the rear periphery of the rear pillar RP surpassing the rear pillar RP. The assist grips 11F and 11B are located in the area of the roof side rail portions 22 of the split part 20A and 20B.

Figure 7:
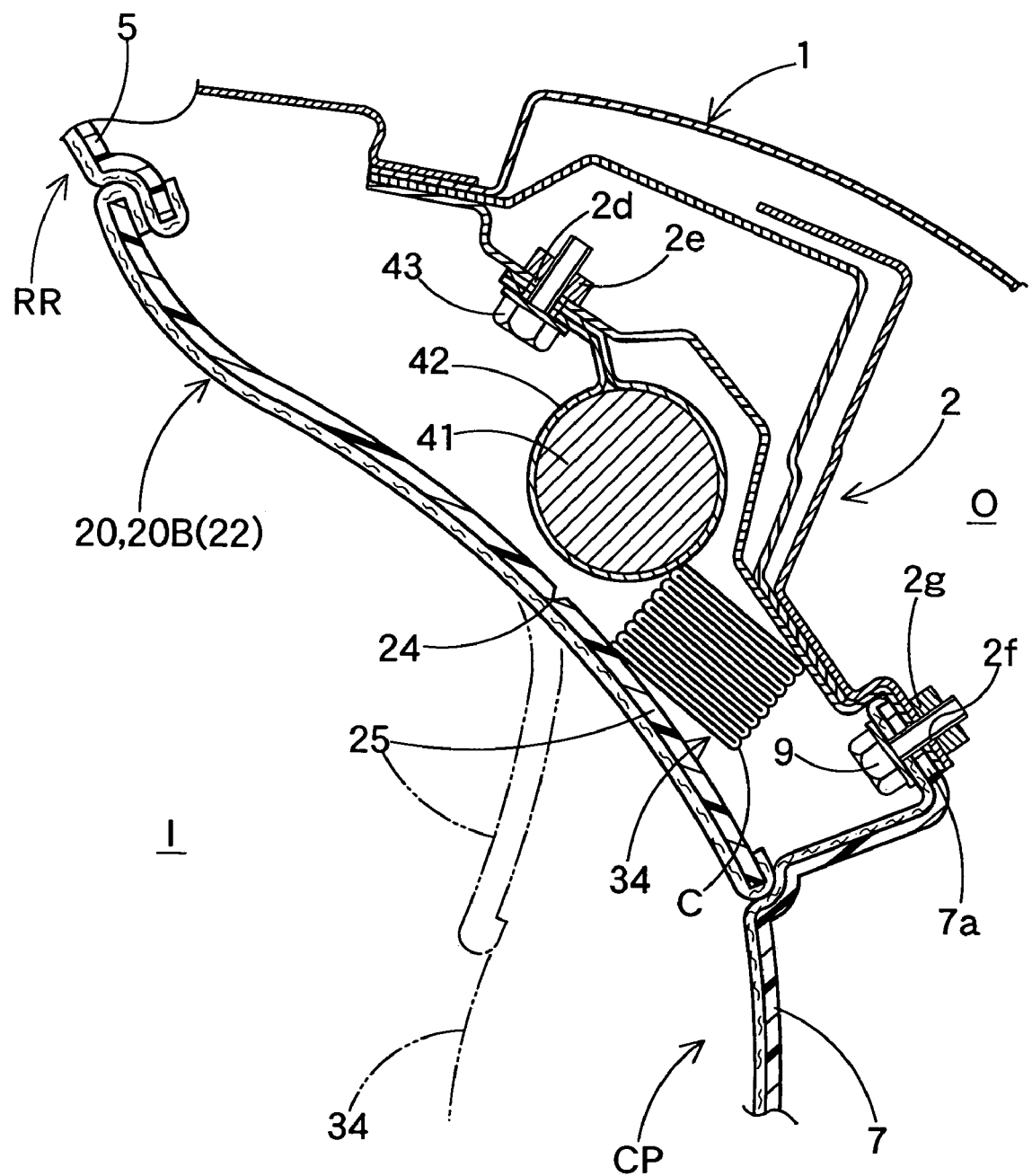
FIG. 7 is a sectional view taken along line VII—VII in FIG. 1.
Figure 8:
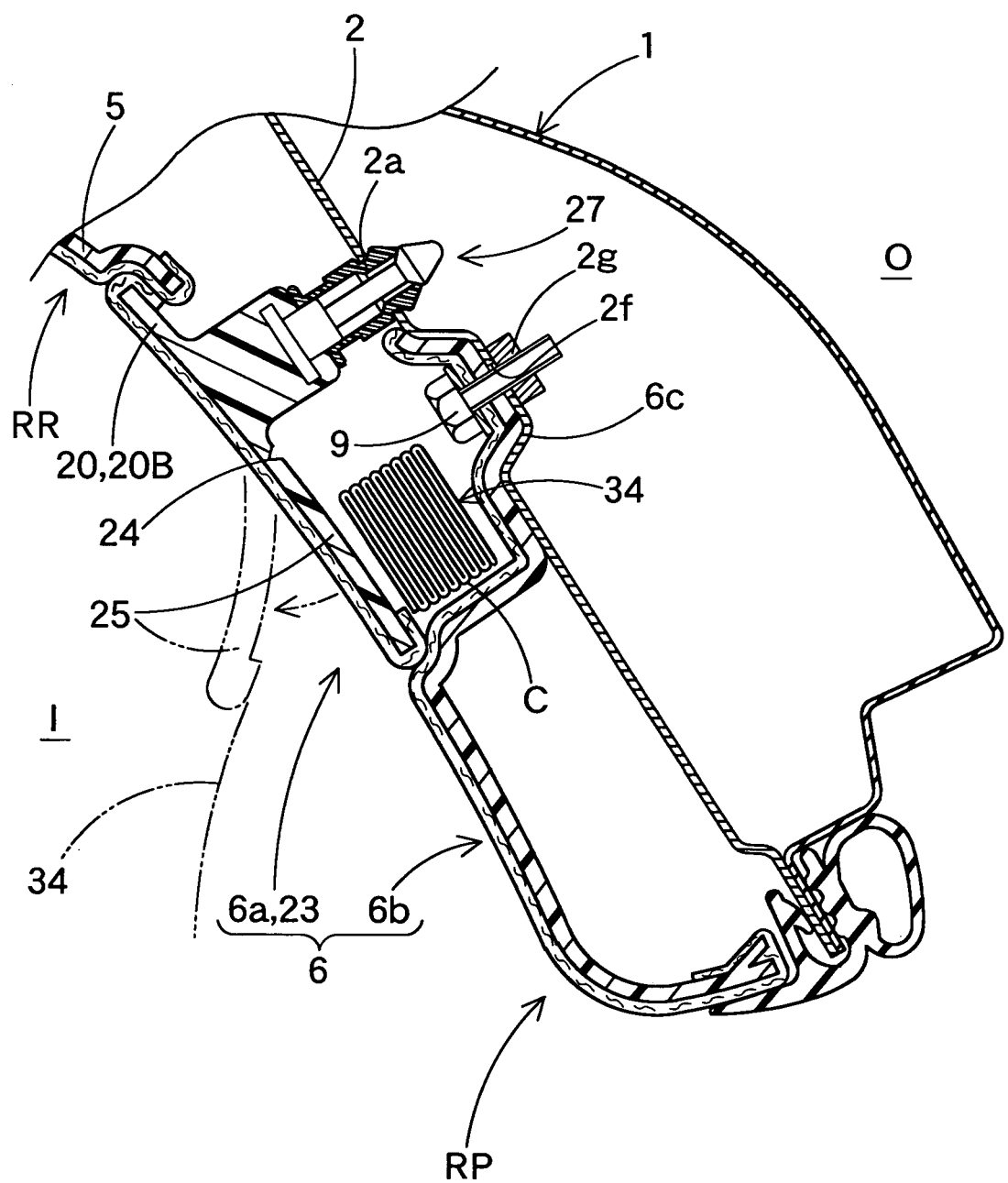
FIG. 8 is a sectional view taken along line VIII—VIII in FIG. 1.

In the foregoing embodiment, as shown in FIGS. 1, 8 and 9, a rear pillar garnish 6 for covering the interior side I of the rear pillar RP includes an upper part 6a located in the upper and rear edge parts, i.e., the rear pillar garnish portion 23 of the split part 20B, and a lower part 6b fixed to the inner panel 2 in the rear pillar RP by mounting bolts 9 or the like. As shown in FIGS. 8 and 9, an upper edge part 6c of the lower part 6b extends from the interior I toward the exterior O, and then is secured to the inner panel 2 by a plurality of mounting bolts 9. The bolts 9 are fastened into nuts 2g provided in mounting holes 2f in the inner panel 2. In the meantime, in a center pillar garnish 7 for covering the interior side I of the center pillar CP, too, as shown in FIG. 7, its upper edge part 7a extends from the interior I toward the exterior O, and is secured to the inner panel 2 by the mounting bolts 9. These upper edge parts 6c and 7a enable the airbag 34 to securely deploy in the interior side I of the garnish lower part 6b and the garnish 7 upon deployment, not between the garnish lower part 6b or the garnish 7 and the inner panel 2.

As shown in FIGS. 1 to 4, 8, 9 and 11 to 13, the split parts 20A and 20B of the airbag cover 19 are provided at predetermined positions in the exterior side O with mounting members 27 and mounting portions 29 for attaching the split parts 20A and 20B to the inner panel 2.

Figure 2:
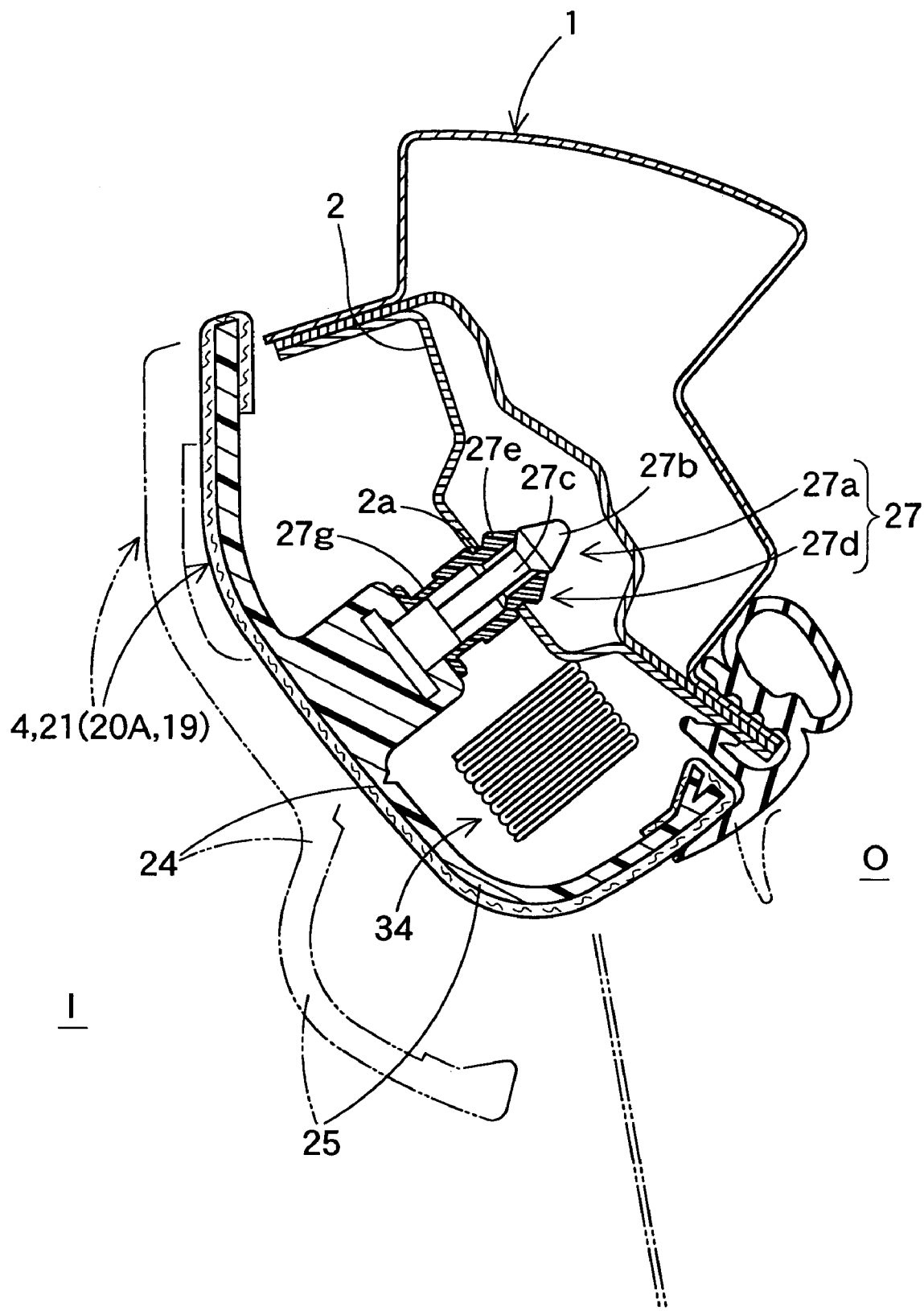
FIG. 2 is a sectional view taken along line II—II in FIG. 1.
Figure 3:
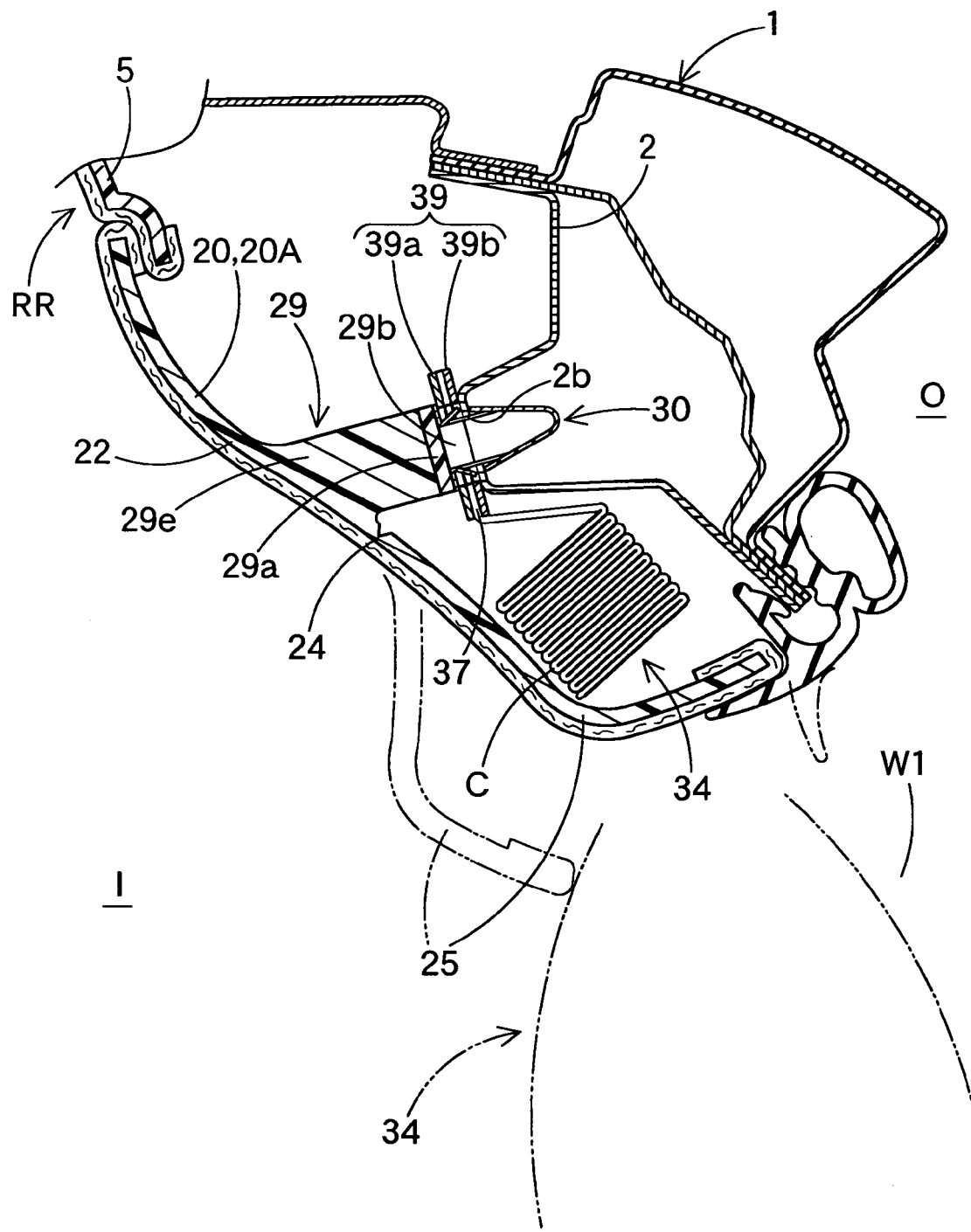
FIG. 3 is a sectional view taken along line III—III in FIG. 1.
Figure 12A:
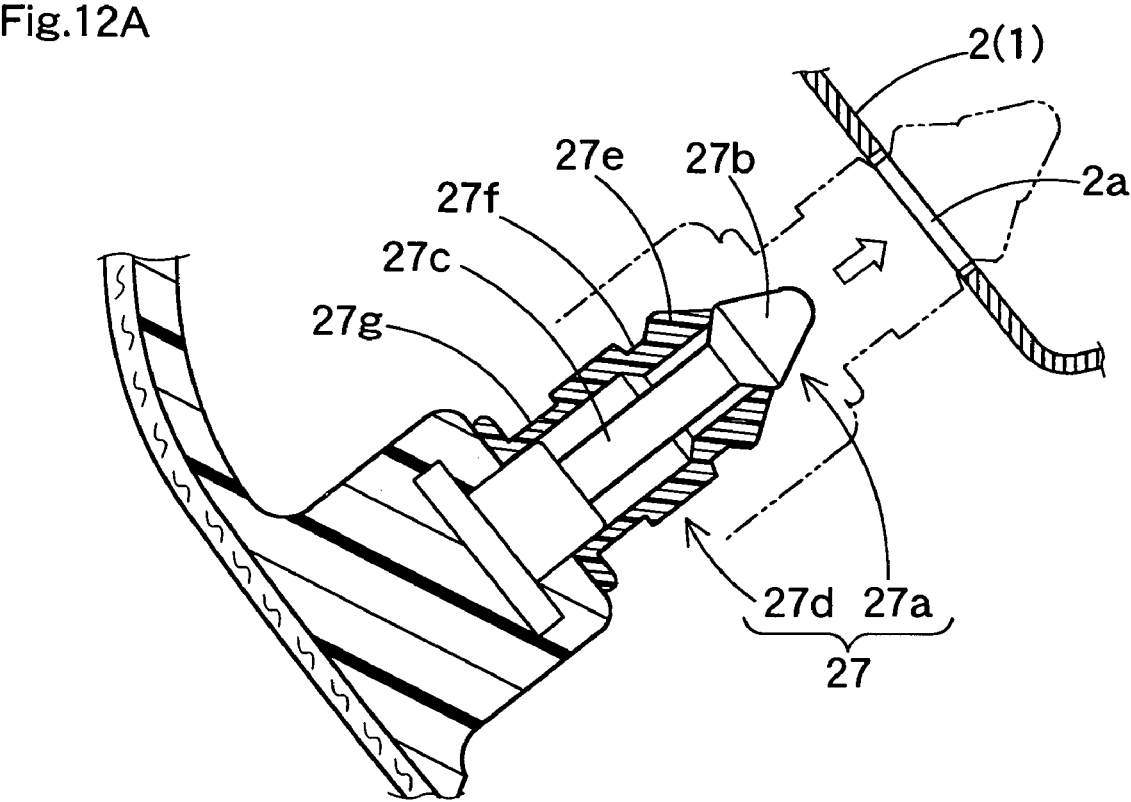
FIGS. 12A and 12B are sectional views illustrating an attachment process of the airbag module in FIG. 11 to the vehicle, taken along line XII—XII in FIG. 11.
Figure 12B:
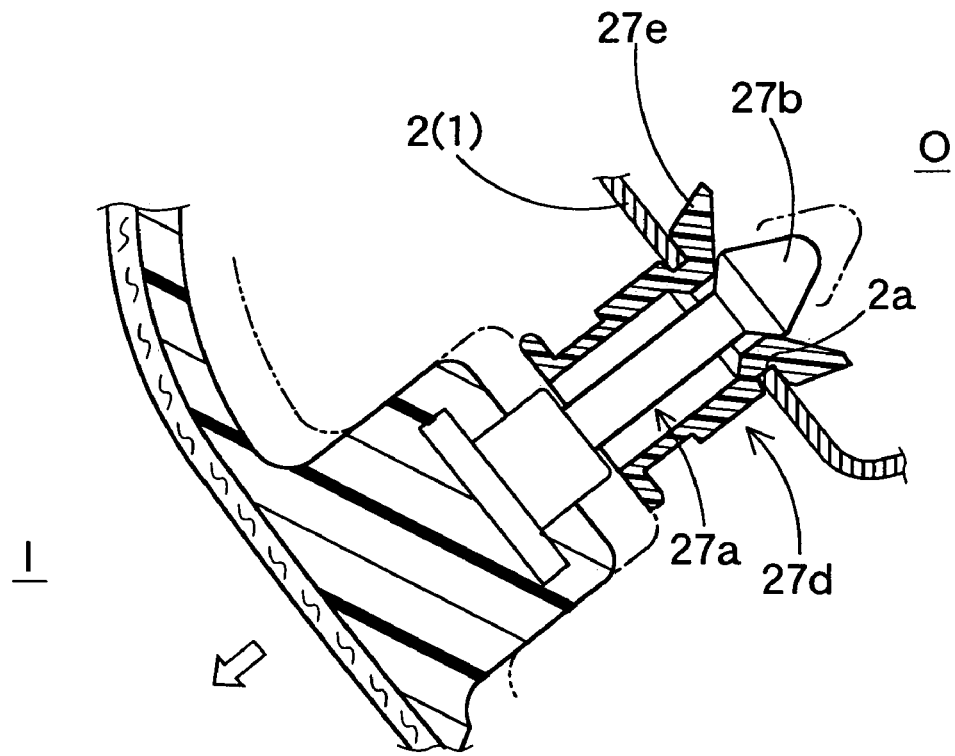

As shown in FIGS. 2, 8 and 12, each of the mounting members 27 includes a metal axis 27a embedded in the exterior side O of the airbag cover 19, and a cap 27d made from rubber or soft synthetic resin to cover the axis 27a. The axis 27a includes a neck portion 27c and a head 27b bulged in radius direction at a leading end of the neck portion 27c. The cap 27d has a substantially cylindrical shape capable of being retained by the head 27b, and is provided with a thick retaining portion 27e located at the leading end, a retaining recess 27f located in the outer circumference near a root part of the retaining portion 27e, and a U-groove 27g located in the outer circumference near a root part of the cap 27d. The mounting member 27 is secured to the inner panel 2 by being inserted into the mounting hole 2a of the inner panel 2 up to the position of the retaining recess 27f, with the axis 27a sheathed with the cap 27d, such that the cap retaining portion 27e held at the axis head 27b is retained by the exterior periphery of the mounting hole 2a. In this mounted state, even if the airbag cover 19 is pulled toward the interior I forcefully, only the cover 19 shifts toward the interior I according to plastic deformation of the cap retaining portion 27e, as shown in FIG. 12B, but the axis head 27b and the cap retaining portion 27e are not pulled out of the mounting hole 2a, so that the mounting member 27 is securely attached to the inner panel 2.

In occasions of removing the mounting member 27 from the inner panel 2 for maintenance and so on, the mounting member 27 is firstly pushed in toward the exterior O until the U-groove 27g of the cap 27d is positioned in the inner circumference of the mounting hole 2a (refer to double-dotted lines in FIG. 12A). Since an inner diameter of the cap 27d is predetermined such that the head 27b of the axis 27a may be pulled out of the cap 27d, the axis 27a is then pulled out of the cap 27d and the mounting hole 2a while leaving the cap 27d retained in the periphery of the mounting hole 2a. Thus the split parts 20A and 20B are detached from the inner panel 2.

As shown in FIGS. 1, 4, 11, and 13, the split part 20A is provided with two mounting portions 29 for attaching the split part 20A to the inner panel 2 together with the mounting portions 37 of the airbag 34 on which the mounting bracket 39 is applied. Each of the mounting portions 29 includes a mounting seat 29a provided with a plurality of retaining legs 29c for retaining the mounting bracket 39 attached to the mounting portion 37. A spacer 29b is projected from the mounting seat 29a to be inserted in between side walls 30b of a later-described retaining piece 30. The mounting seat 29a is detachably joined with a base portion 29e as part of a main body of the split part 20A by mounting legs 29d.

Figure 4:
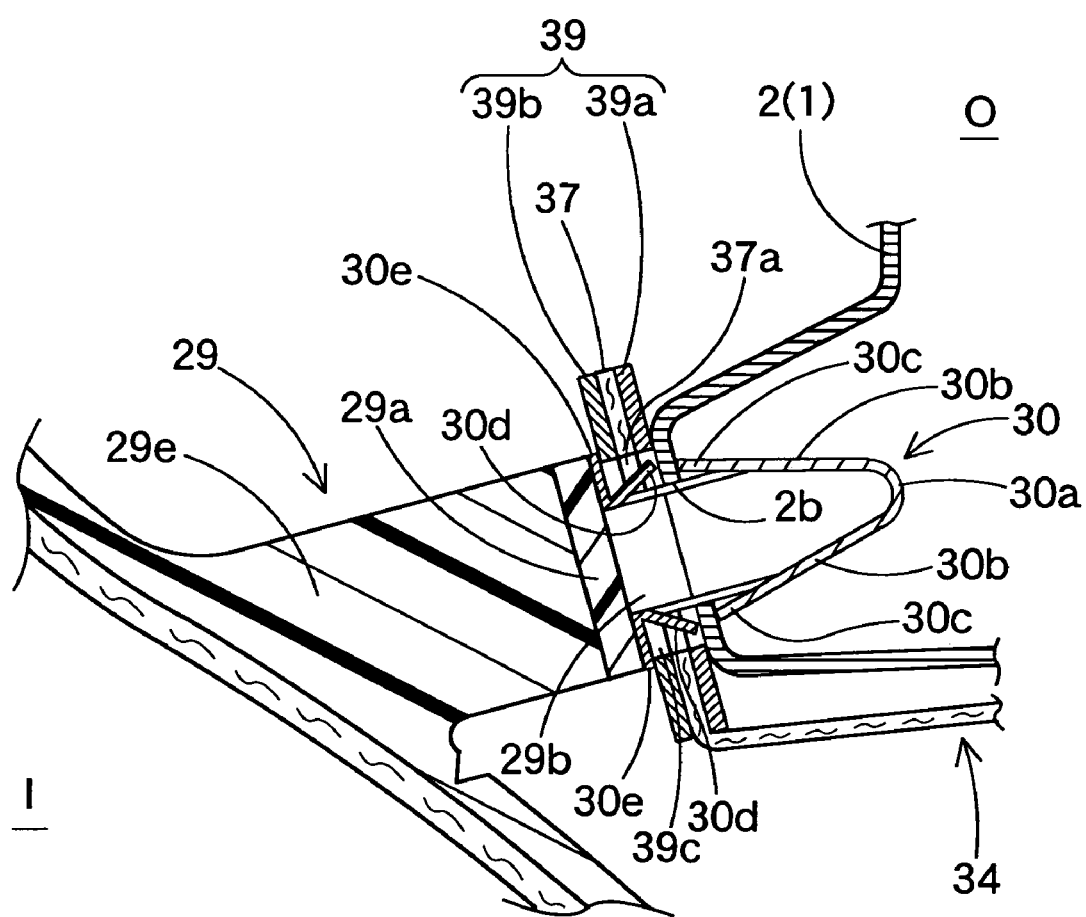
FIG. 4 is a partial enlarged section of FIG. 3 showing a fixed state of an airbag cover.
Figure 5:
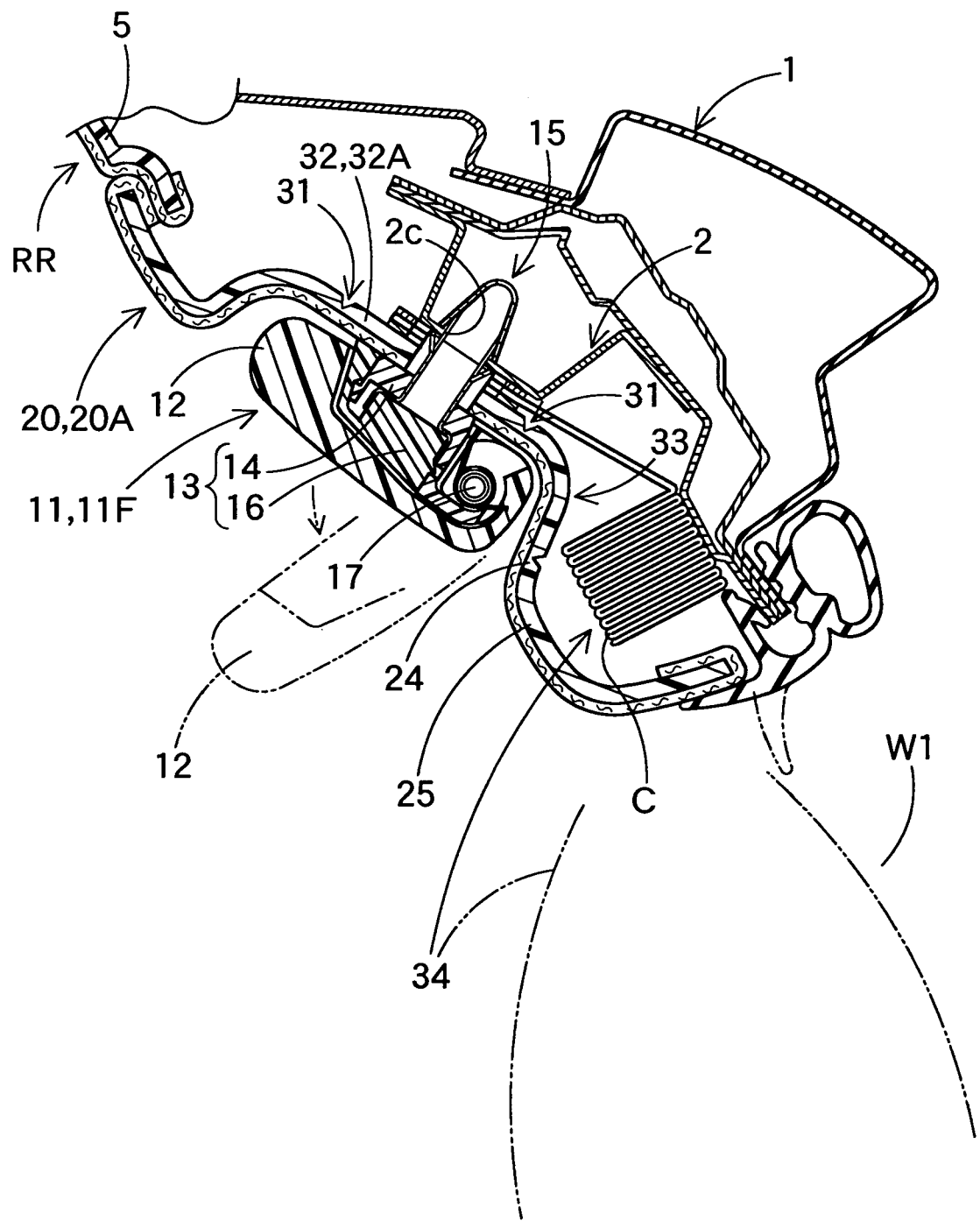
FIG. 5 is a sectional view taken along line V—V in FIG. 1.

Each of the retaining pieces 30 is attached to the mounting seat 29a together with the mounting bracket 39 when the bracket 39 is fixed to the mounting seat 29a. The retaining piece 30 is constructed similarly to the retaining piece 15 of the fixing portion of the assist grip 11. More specifically, the retaining piece 30 is formed by bending a band-shaped spring sheetmetal to have a substantially U-shaped section with its leading end 30a rounded, and is bifurcated from the leading end 30a into side walls 30b. Each of the side walls 30b includes a retaining projection 30c cut and raised outwardly, and a holding projection 30d also cut and raised outwardly to confront an interior end of the retaining projection 30c. The retaining piece 30 is further provided in interior ends of the side walls 30b with a flange-shaped grip portion 30e projecting outwardly. As shown in FIGS. 13A and 13B, each of the retaining pieces 30 is joined with the mounting seat 29a of the split part 20A by inserting the retaining piece 30 into the through hole 39c of the mounting bracket 39 and the mounting hole 37a of the mounting portion 37 from the leading end 30a, applying the mounting seat 29a of the mounting portion 29 to the grip portion 30e, and hooking the retaining legs 29c on the bracket 39. When the retaining piece 30 is inserted into the mounting hole 2b of the inner panel 2, as shown in FIGS. 4 and 13C, the retaining projections 30c are once deformed to pass through the mounting hole 2b, and then spring back such that the periphery of the mounting hole 2b is positioned between the retaining projections 30c and the holding projections 30d. Consequently, the retaining piece 30 is secured to the inner panel 2 tightly by being suppressed from moving toward the interior I or exterior O, and secures the mounting portion 29 of the split part 20A to the inner panel 2 together with the mounting portion 37 of the airbag 34.

In such an occasion of maintenance after the mounting portions 29 of the split part 20A are secured to the inner panel 2 together with the mounting portions 37 of the airbag 34, if the split part 20A is pulled toward the interior I forcefully, the retaining legs 29d are detached from the base portion 29e, so that the split part 20A is removed from the inner panel 2 while the mounting seats 29a, the retaining pieces 30, the mounting brackets 39 and so on remain in the inner panel 2. If the retaining legs 29d are then detached from the mounting bracket 39, the spacer 29b is removed from a space between the sidewalls 30b, which makes the grip portion 30e of the retaining piece 30 grippable. Then the side walls 30b are brought closer to each other by gripping the grip portion 30e to shift the retaining projections 30c into the mounting hole 2b from the periphery of the mounting hole 2b, so that the retaining piece 30 is removed from the mounting hole 2b and the mounting portion 37 is removed from the inner panel 2.

As shown in FIGS. 6, 14 and 15, each of the split parts 20A and 20B is provided at each position where the fixing portion 13 of the assist grip 11F or 11B is located with a mounting seat 32 having a through hole 32a through which the side walls 15b of the retaining piece 15 of the fixing portion 13 are inserted. Each of the mounting seats 32 is secured to the inner panel 2 with the periphery of the through hole 32a pressed by the base 14 of the fixing portion 13. As shown in FIG. 14, each of the mounting seats 32 (32A) of the split part 20A is provided in the exterior side O with a plurality of retaining legs 32b like the retaining legs 29c of the mounting portion 29 for retaining the mounting bracket 39. On the other hand, each of the mounting seats 32 in the split part 20B only includes a through hole 32a, but not retaining legs, as shown in FIG. 15.

As shown in FIGS. 6, and 14 to 16, an annular-shaped thinned breakable portion 31 is formed all around each of the mounting seats 32. The breakable portion 31 is located slightly apart from the portion pressed by the base 14, and is adapted to separate the mounting seat 32 and a portion 33 therearound including the door portion 25 when broken.

To mount the head-protecting airbag device M1 on the vehicle, the airbag 34, the mounting brackets 39 and 42, the inflator 41, and the split parts 20A are assembled into an airbag module AS, firstly, as shown in FIG. 11. When the airbag module AS is formed, the airbag 34 is folded up firstly. As shown in FIG. 10, the airbag 34 is bellows-folded, from flat expanded, and deflated state, on crest and valley folds C (as referred to FIGS. 5, 7, 8 and 10), so that its lower edge 34b is brought closer to the upper edge 34a. After folding up., an unillustrated breakable tape member is wound around the folded airbag 34 at predetermined intervals for keeping the folded-up configuration. In the meantime, the predetermined mounting brackets 39, 39A or 39B are attached to the individual mounting portions 37, and the inflator 41 with the bracket 42 attached thereto is joined with the joint port 36 by the clamp 45.

Subsequently, the retaining pieces 30 are inserted into the mounting holes 37a of two mounting portions 37 in the front part of the airbag 34 and the through holes 39a of the mounting brackets 39 applied thereon, from the leading end 30a, such that the grip portion 30e abuts against the inner plate 39b. Then the mounting portions 29 of the split part 20A in which the mounting seats 29a are mounted on the base portions 29e are located on those mounting portions 37, and the spacers 29b are inserted in between the side walls 30b of the retaining pieces 30, and the retaining legs 29b are hooked on the outer plates 39a of the mounting brackets 39. If the mounting legs 32b of each of the mounting seats 32A in the split part 20A are hooked on the outer plate 39a of the corresponding mounting bracket 39, the airbag module AS is formed of the airbag 34, the mounting brackets 39 and 42, the inflator 41, and the split parts 20A.

Now the airbag module AS is mounted on the vehicle. More specifically, each of the mounting members 27 of the split part 20A, with the axis 27a sheathed with the cap 27d, is inserted into the mounting hole 2a in the inner panel 2 up to the position of the retaining recess 27f such that the cap retaining portion 27e held at the axis head 27b is retained by the exterior periphery of the mounting hole 2a. Thus each of the mounting members 27 is attached to the inner panel 2. As to each of the mounting portions 29, when each of the retaining pieces 30 is inserted into the mounting hole 2b, the retaining projections 30c are once deformed to pass through the mounting hole 2b, and then spring back such that the periphery of the mounting hole 2b is positioned between the retaining projections 30c and the holding projections 30d. Consequently, the mounting portions 29 are secured to the inner panel 2 tightly by being suppressed from moving toward the interior I or exterior O. In the meantime, the hook 39c of each of the mounting brackets 39A and 39B is hooked in the retaining hole 2h, and the mounting brackets 42 holding the inflator 41 are bolt 43 fixed to the inner panel 2. Moreover, the rearmost mounting portion 37B of the airbag 34 and the mounting bracket 39B are secured to the inner panel 2 by the bolt 47.

Subsequently, the split part 20B is located at a predetermined position of the inner panel 2 and is attached to the inner panel 2 utilizing the mounting members 27. Then the retaining pieces 15 of the fixing portions 13 in the assist grips 11F and 11B are inserted through the through holes 32a of the mounting seats 32 or 32A in each of the split parts 20A and 20B, the through holes 39c of the mounting brackets 39 or 39A, and the mounting holes 37a of the mounting portions 37, and then into the mounting holes 2c of the inner panel 2, and held thereat. Thus the fixing portions 13 hold the mounting seats 32 (32A) and the mounting brackets 39 (39A), and secure peripheries of the mounting seats 32 (32A) of the split parts 20A and 20B and the airbag 34 to the inner panel 2. Thus the head-protecting airbag device M1 is mounted on the vehicle.

In mounting the airbag device M1 on the vehicle, an unillustrated wire extending from a control device for inputting actuating signals is connected to the inflator 41. Before mounting the airbag device M1, the center pillar garnish 7 and the lower part 6b of the rear pillar garnish 6 are attached to the vehicle body 1 by bolts 9 and so on, and the roof head lining 5 is also attached to the vehicle.

When the inflator 41 is actuated after the airbag device M1 is mounted on the vehicle, inflation gas is discharged from the inflator 41, and flows into the gas admissive portion 35 of the airbag 34 via the joint port 36. The airbag 34 then inflates and breaks the tape member, pushes and opens the door portion 25 of the airbag cover 19, and deploys to cover the side windows W1 and W2.

Figure 17:
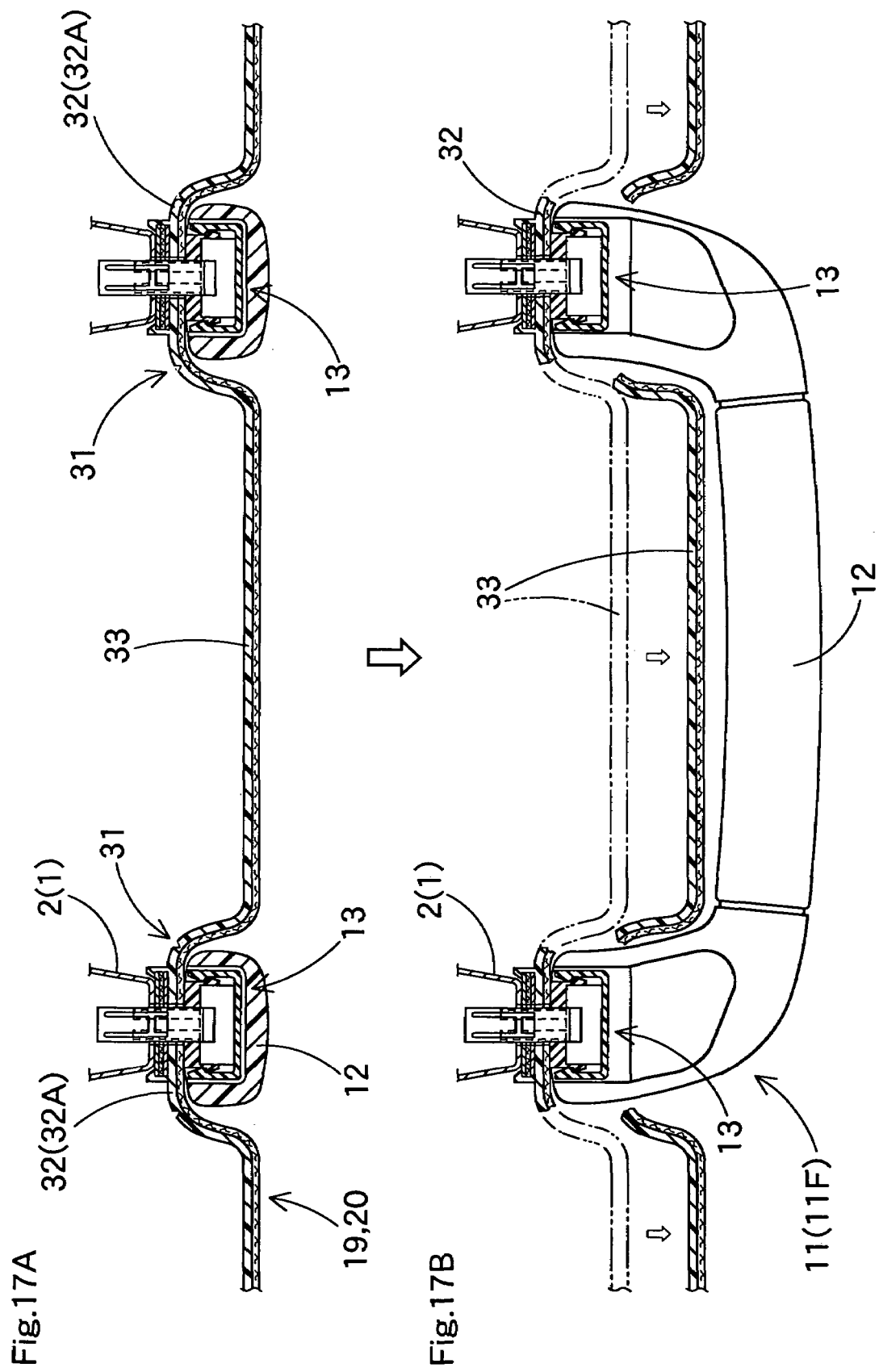
FIGS. 17A and 17B are cross sections illustrating a movement of the airbag cover in the vicinity of fixing portions of the assist grip upon airbag deployment.
Figure 18:
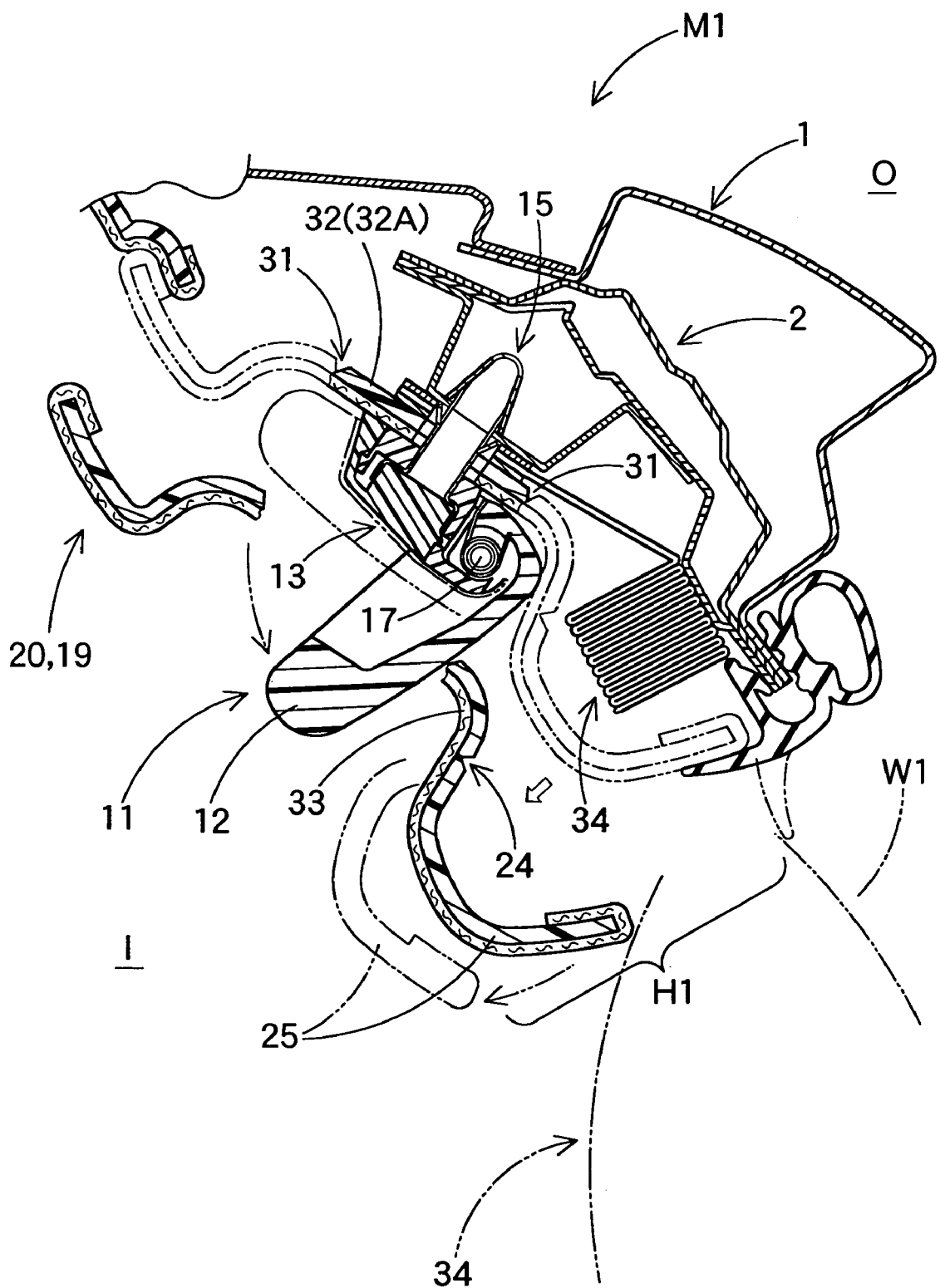
FIG. 18 is a cross section illustrating the movement of the airbag cover in the vicinity of fixing portions of the assist grip upon airbag deployment, which is comparable with FIG. 5.

At this time, in the head-protecting airbag device M1, the airbag cover 19 is pushed in the vicinity of the fixing portions 13 of the assist grip 11 by the inflating airbag 34, and breaks the breakable portion 31, so that the peripheral portion 33 including the door portion 25 shifts inward I while leaving the mounting seats 32 and 32A fixed by the fixing portions 13 of the assist grips 11 remaining in the inner panel 2, as shown in FIGS. 17 and 18. Accordingly, an opening H1 of the door portion 25 is enlarged along with the inward movement of the peripheral portion 33, compared with a case where the door portion 25 only opens.

After the breakable portion 31 is broken, the peripheral portion 33 blocked by the grip portion 12 of the assist grip 11 fixed to the vehicle body 1 at the fixing portions 13 is prevented from excessively projecting inward I.

Therefore, even if the fixing portions 13 of the assist grips 11 secure the split parts 20A and 20B to the vehicle body 1, the head-protecting airbag device M1 assures an enlarged opening H1 of the door portion 25 of the airbag cover 19 for smooth deployment of the airbag 34.

Figure 19A:
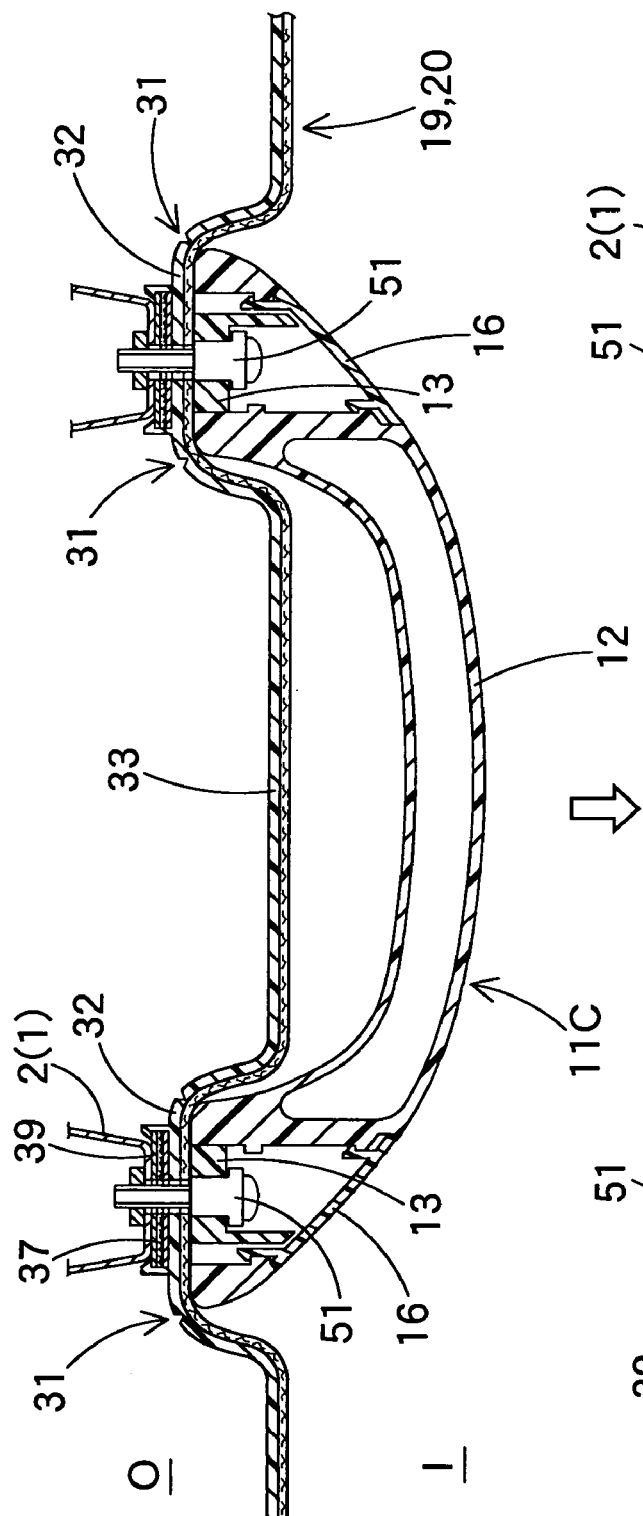
FIGS. 19A and 19B are sectional views illustrating a modification of the fixing portions of the assist grip.
Figure 19B:
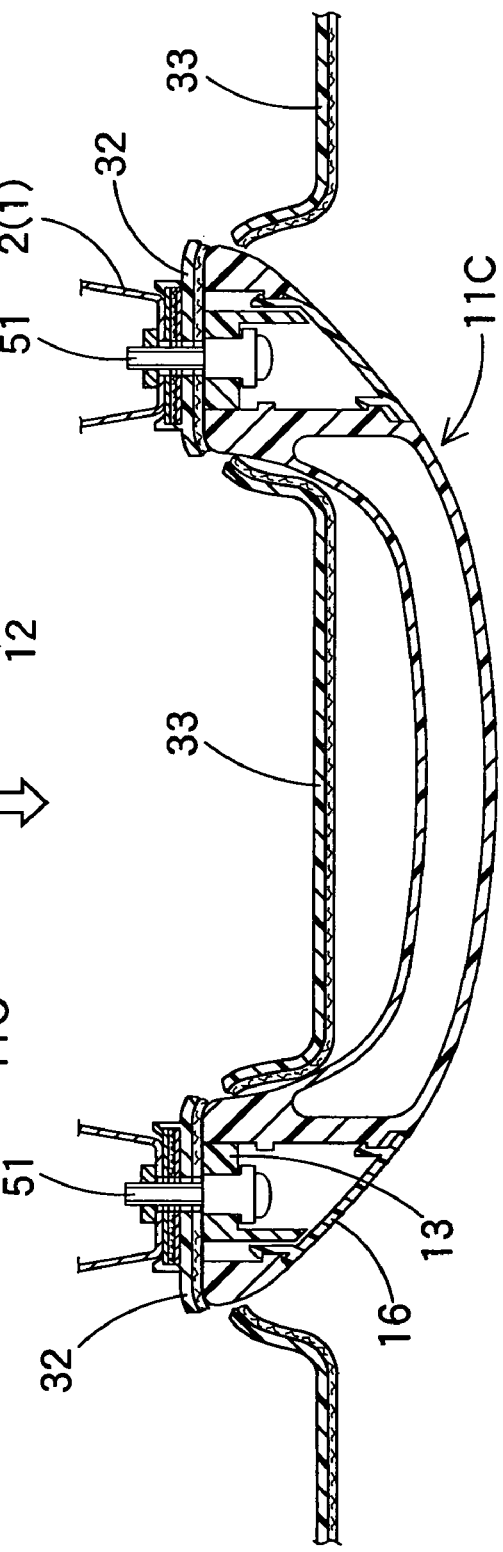

Although the foregoing embodiment shows the assist grip 11 whose grip portion 12 is turned and pulled out for service, it will also be appreciated to employ a fixed-type assist grip whose grip portion is projected inward I than the fixing portions 13 in both ends from the beginning, as an assist grip 11C shown in FIG. 19. In this fixed-type assist grip 11C, each of the fixing portions 13 is bolt 51 fixed to the inner panel 2, together with a mounting portion 37 of the airbag 34 with a mounting bracket 39 and a mounting seat 32 of the airbag cover 19. Heads of the bolts 51 are covered by caps 16 which are fastened with the fixing portions 13.

Although the fixing portions 13 of the assist grip 11 in the foregoing embodiment employ clip-type retaining pieces 15 of spring sheetmetal that make strong fixation to the vehicle body 1, bolts 51 or different clips may be used to secure the fixing portions 13 to the inner panel 2, as shown in FIG. 19. However, with the fixing portion 13 employing the retaining piece 15 of the foregoing embodiment, if the cap 16 is removed, the retaining piece 15 is pulled out of the mounting hole 2c by gripping the grip portion 15e of the retaining piece 15, and then the fixing portion 13, the mounting seat 32 of the airbag cover 19, and the mounting portion 37 of the airbag 34 are successively removed from the inner panel 2 easily, which facilitates maintenance. Moreover, since the fixing portion 13, the mounting seat 32 of the airbag cover 19, and the mounting portion 37 of the airbag 34 are attached to the inner panel 2 at one time by inserting the retaining piece 15 into the mounting hole 2c, attachment and removal of the assist grip 11 are also facilitated.

Figure 20:
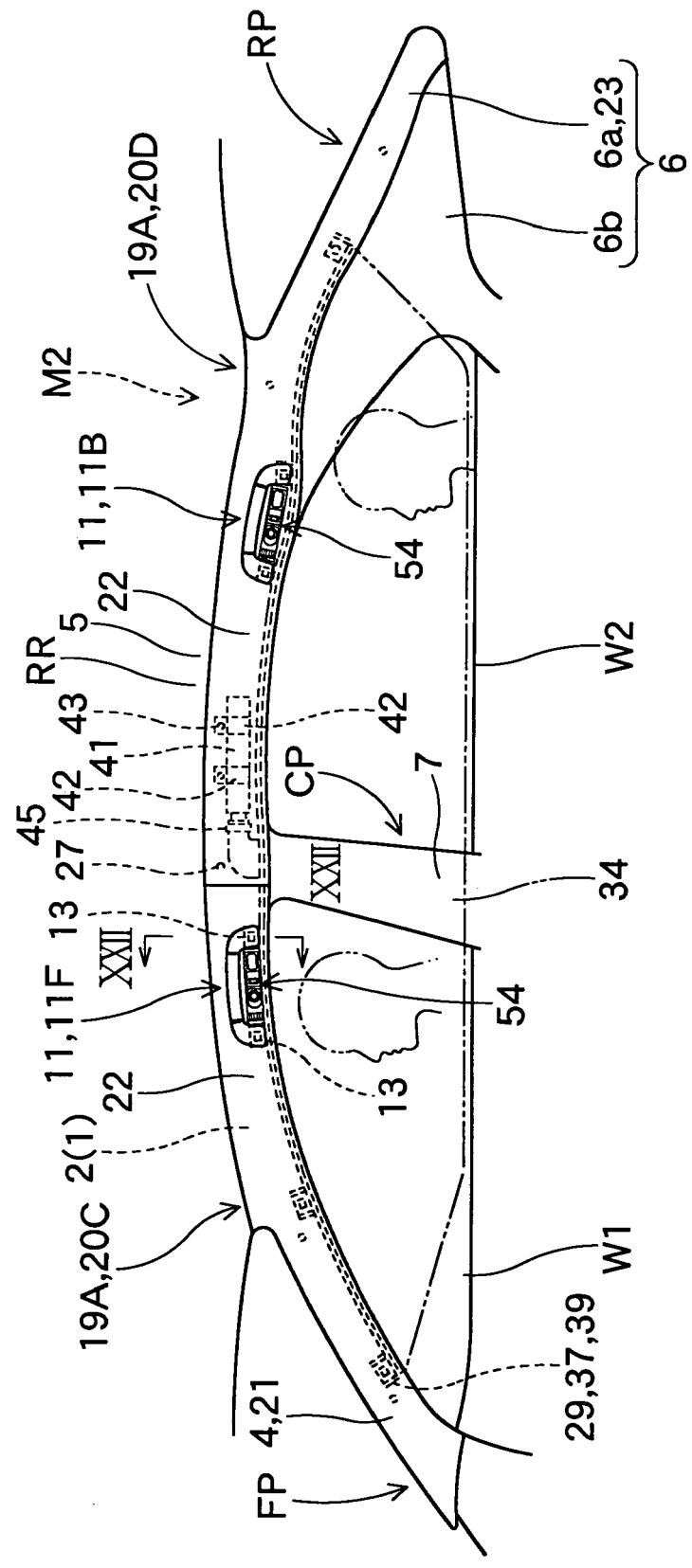
FIG. 20 is a front view of a second embodiment of the head-protecting airbag device according to the present invention, as viewed from the vehicle's interior.

Now a second embodiment of the head-protecting airbag device of the present invention is described. Referring to FIG. 20, a head-protecting airbag device M2 locates a functional part 54 between the fixing portions 13 of each of the assist grips 11F and 11B. The airbag device M2 are constructed similarly to the head-protecting airbag device M1 in the first embodiment except in the functional part 54 and an airbag cover 19A, and therefore, descriptions of common members and portions are omitted by designating them with common reference numerals. The airbag cover 19A is constructed of split parts 20C and 20D similarly to the airbag cover 19 in the airbag device M1 except in a later-described recessed portion 20a and a breakable portion 31A, and therefore, descriptions of common members and portions are omitted by designating them with common reference numerals.

Figure 21:
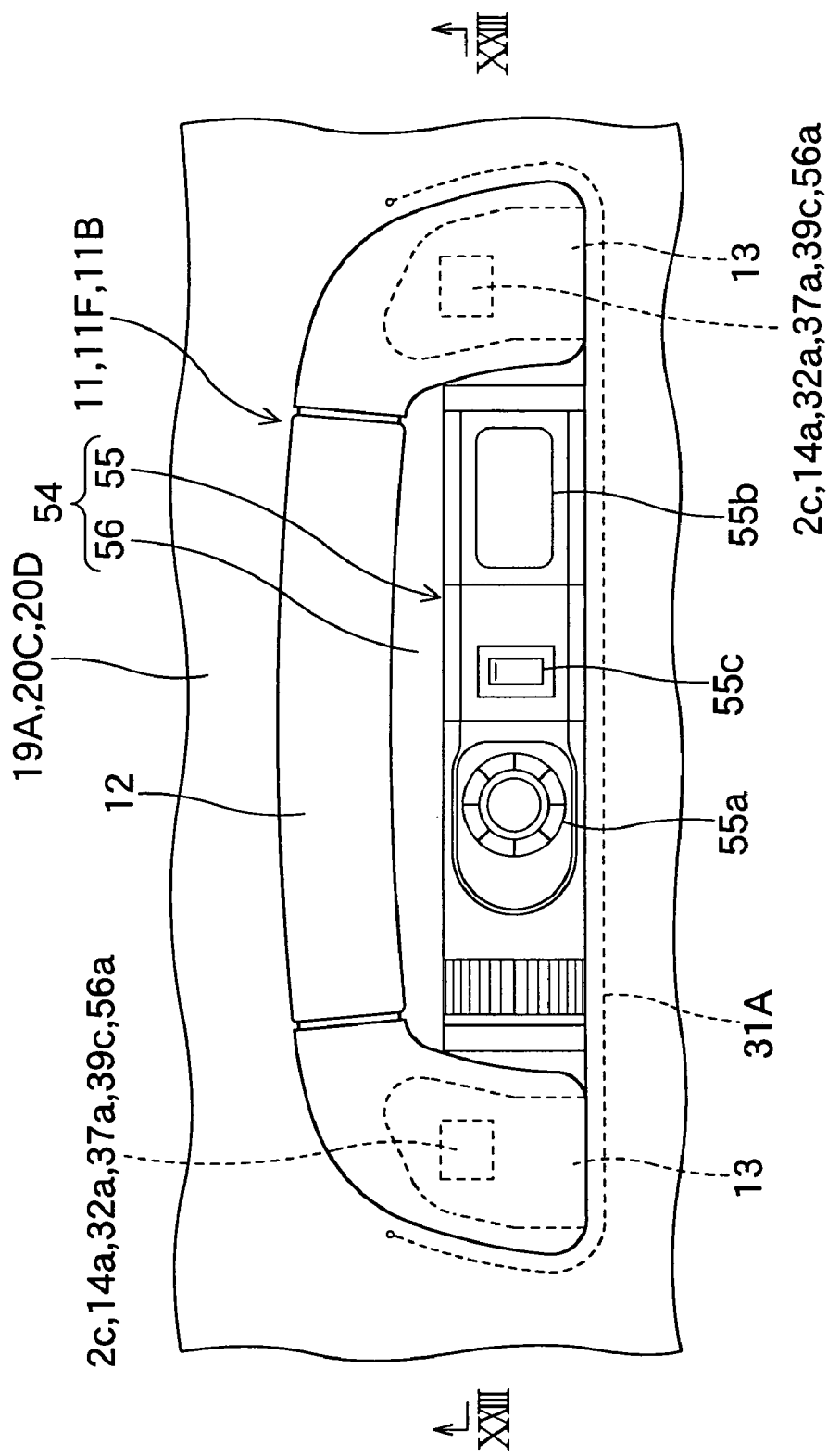
FIG. 21 is an enlarged front view of an assist grip in the second embodiment and a portion therearound.
Figure 22:
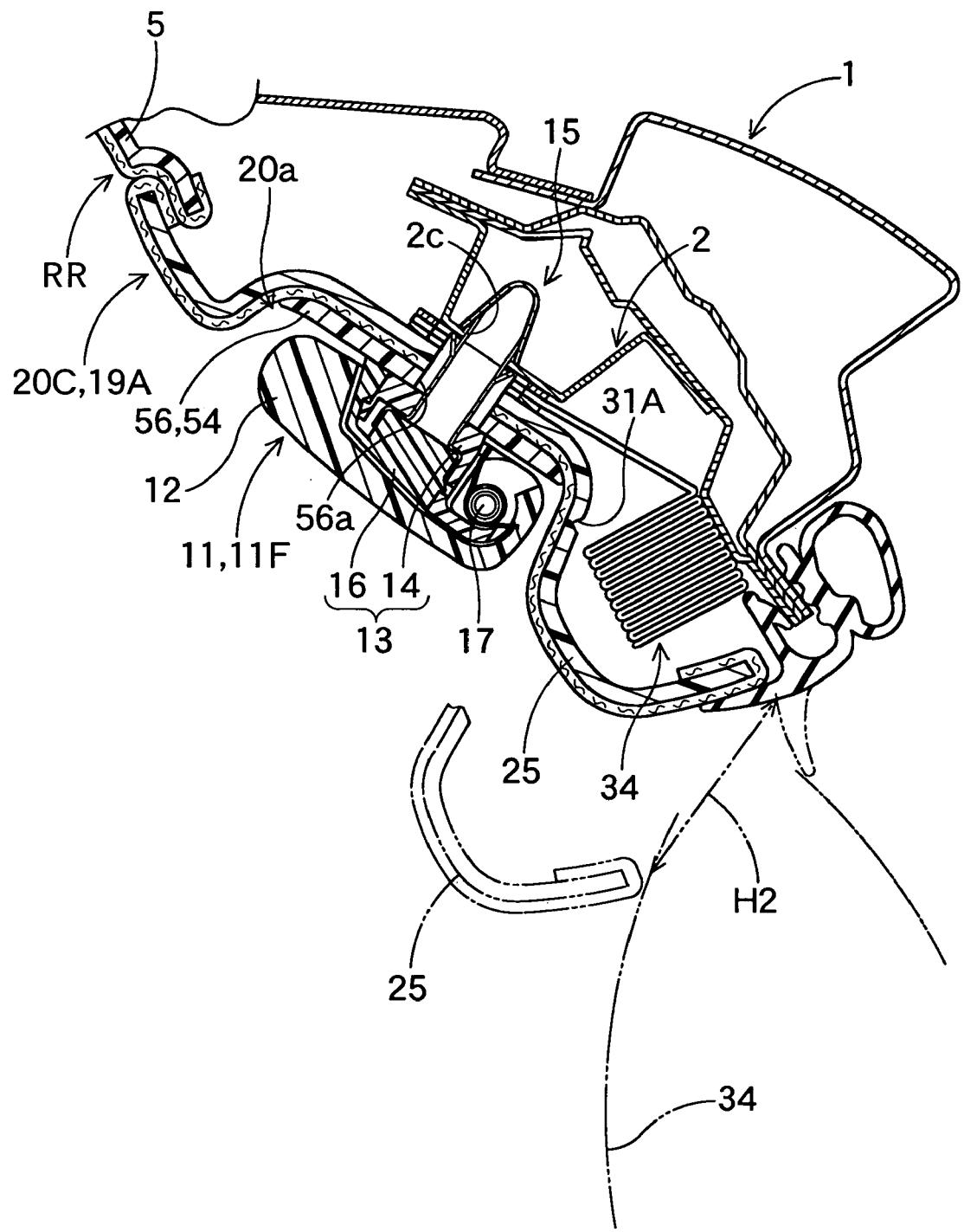
FIG. 22 is a sectional view taken along line XXII—XXII in FIG. 20.
Figure 23:
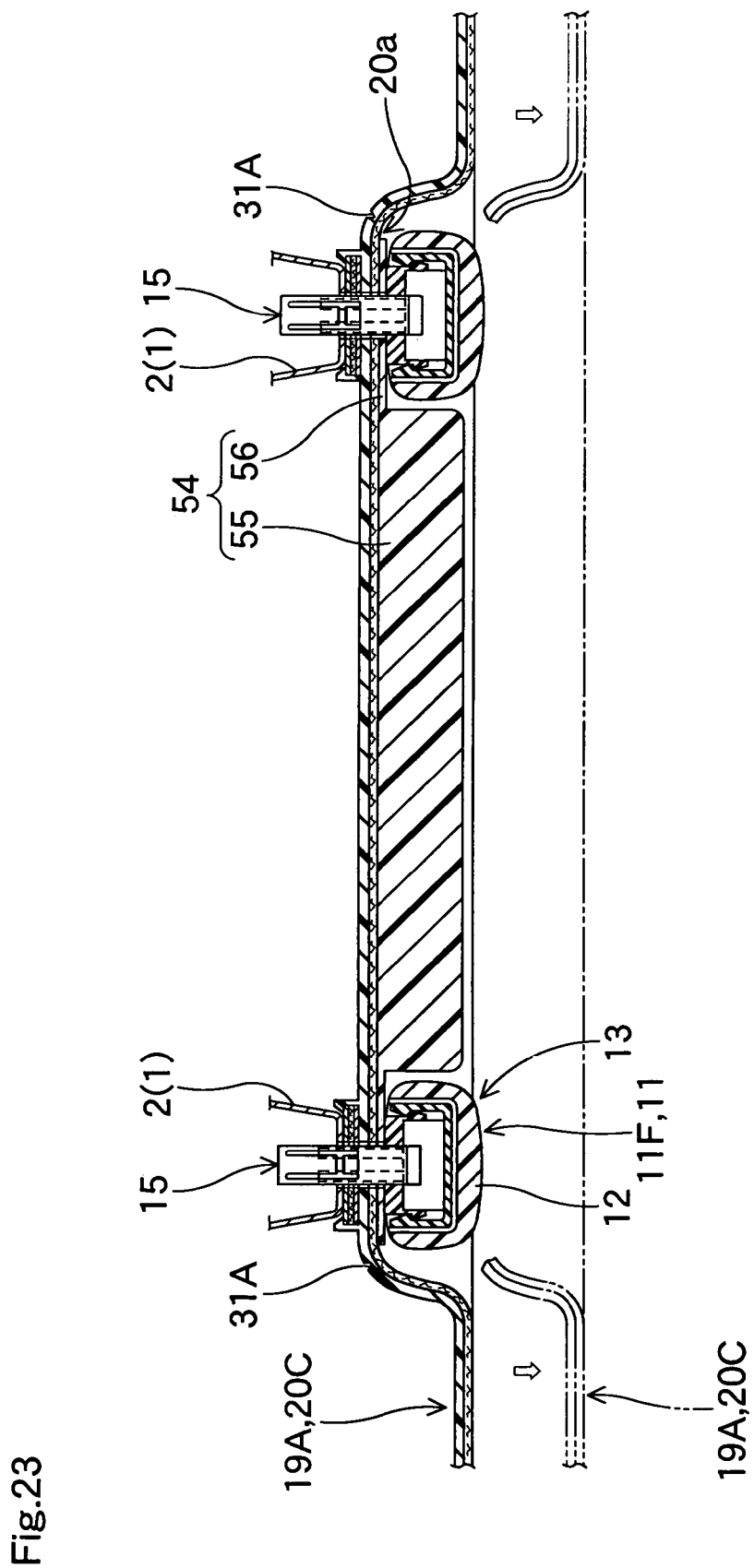
FIG. 23 is a sectional view taken along line XXIII—XXIII in FIG. 21.

As shown in FIGS. 20 and 21, the functional part 54 includes a main body 55 located between the fixing portions 13 and a panel-shaped flange portion 56 extending from the main body 55 to be located in the exterior O than the assist grip 11. The main body 55 includes a map lamp 55a, a room lamp 55b, and a switch 55c for turning them on and so on. As viewed from the interior, the flange portion 56 is shaped substantially the same as the assist grip 11. The functional part 54 is secured to the inner panel 2 by the retaining pieces 15 of the assist grip 11, and is provided at positions in the flange portion 56 corresponding to through holes 32a of the split part 20C or 20D with through holes 56a through which side walls 15b of the retaining piece 15 are inserted.

Around the mounting seats 32 in each of the split part 20C and 20D is formed a recessed portion 20a for accommodating the assist grip 11 and the functional part 54. The recess 20a is predetermined such that an interior surface of the assist grip 11 and an interior surface of the main body 55 of the functional part 54 may be substantially flush with an interior surface of the split part 20C and 20D. Each of the split part 20C and 20D is provided in a lower edge part of the assist grip 11 and the functional part 54 with a thinned breakable portion 31A having an U shape along outer shapes of the assist grip 11 and the functional part 54.

In the head-protecting airbag device M2, each of the functional parts 54 is preliminarily assembled with the assist grip 11 utilizing the through holes 56a and the retaining pieces 15, and is secured to the inner panel 2 together with the assist grip 11 as a single module.

With this construction, the airbag cover 19A breaks the breakable portion 31A and opens the door portion 25 upon deployment of the airbag 34, while leaving portions fixed by the functional part 54 remaining fixed to the vehicle body 1. Even if the functional part 54 is located in the airbag cover 19A, therefore, the head-protecting airbag device M2 assures an enlarged opening H2 of the door portion 25 of the airbag cover 19A for smooth deployment of the airbag 34.

Moreover, in the head-protecting airbag device M2, functional parts 54 are collectively located between the fixing portions 13 of the assist grip 11, and accordingly, a peripheral portion of the assist grip 11 is free of other components but the airbag cover 19A. Therefore, appearance around the assist grip 11 is improved as viewed from the interior.

In the foregoing embodiment, the functional part 54 is so constructed as to be fastened in the flange portion 56 to the inner panel 2 utilizing the retaining pieces 15 formed in the fixing portions 13 of the assist grip 11. However, a structure of the functional part should not be limited thereto, but the functional part may be constructed without a flange portion, and fixed to the inner panel by itself.

Although both of the assist grips 11F and 11B are provided with a functional part 54 in the head-protecting airbag device M2, a functional part may be arranged in only one of the assist grips.

Although each of the fixing portions 13 of the assist grip 11 in the head-protecting airbag devices M1 and M2 fixes the mounting portion 37 of the airbag 34 together with the airbag cover 19 or 19A, the fixing portion 13 may fix only the airbag cover 19 or 19A to the vehicle body 1.

Furthermore, although the head-protecting airbag devices M1 and M2 employ the airbag covers 19 and 19A each of which is split up in the front-rear direction, an airbag cover does not necessarily have to be split up in the front-rear direction. However, in light of workability in mounting the head-protecting airbag devices M1 and M2 on the vehicle, it is preferable to employ an airbag cover split up in the front-rear direction into more than one part.

Figure 24:
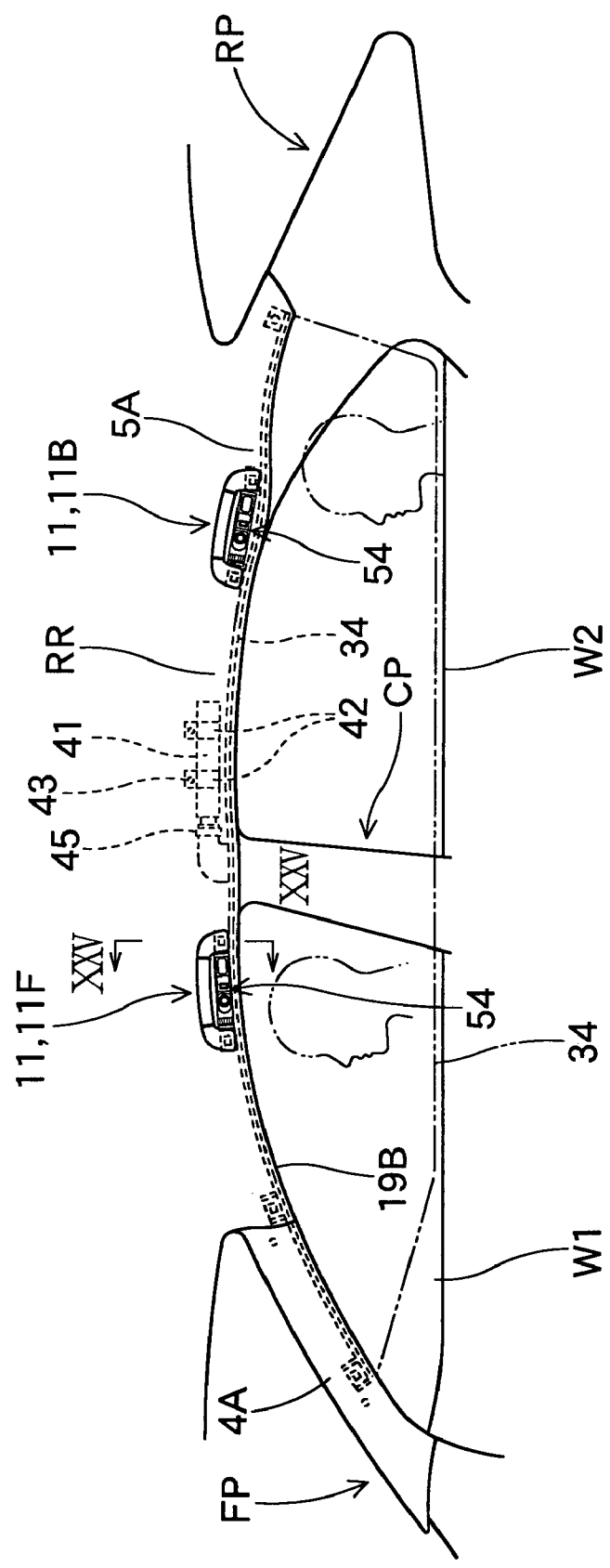
FIG. 24 is a front view of a modification of the head-protecting airbag device, as viewed from the vehicle's interior.
Figure 25:
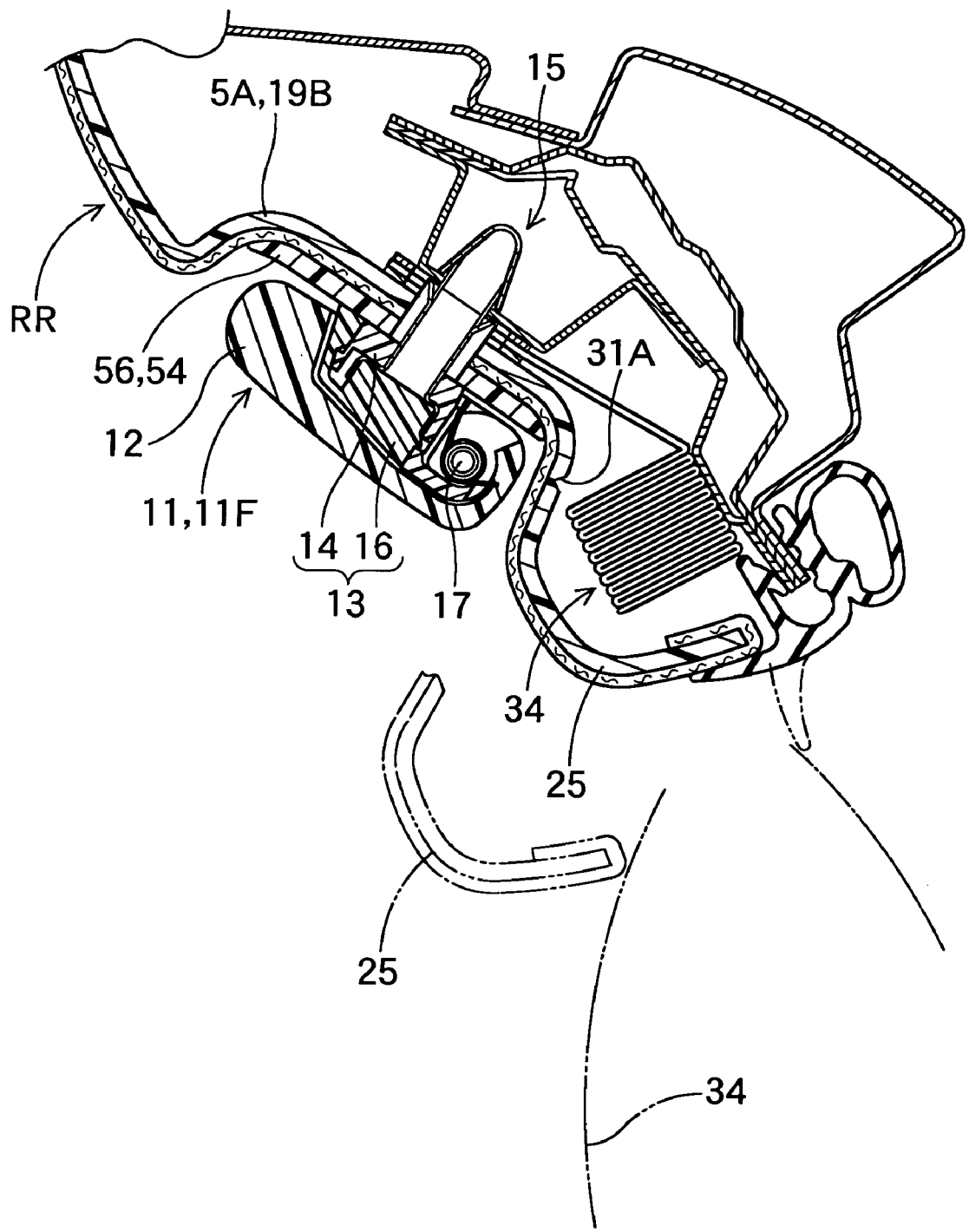
FIG. 25 is a sectional view taken along line XXV—XXV in FIG. 24.

Moreover, in the head-protecting airbag device M1 and M2, the airbag cover 19 and 19A are respectively constituted by a roof side rail garnish provided separately from the roof head lining 5. However, it will also be appreciated that an airbag cover 19B is constituted by lower edge portions of a roof head lining 5A and a front pillar garnish 4A, not employing a roof side rail garnish, as shown in FIGS. 24 and 25.

What is claimed is:

1. A head-protecting airbag device comprising:
    an airbag folded and housed in upper periphery of side windows inside a vehicle, the airbag being deployable to cover the side windows when fed with inflation gas;
    an airbag cover for covering a vehicle's interior side of the folded airbag, the airbag cover including a door portion openable upon airbag deployment in a lower edge thereof; and
    an assist grip located in an arrangement area of the airbag cover, the assist grip including a grip portion and fixing portions located at both ends of the grip portion, wherein:
    the assist grip is secured to vehicle body together with the airbag cover at the fixing portions;
    the airbag cover is provided around each of portions fixed to the vehicle body together with the fixing portions of the assist grip with a breakable portion;
    whereby, when pushed by the inflating airbag, the breakable portion is broken to shift a portion of the airbag cover located toward the door portion inward of the vehicle.

2. The head-protecting airbag device according to claim 1 further comprising a functional part secured to the vehicle body together with the airbag cover and located between the fixing portions of the assist grip, wherein the breakable portion is arranged from outer edges of the fixing portions of the assist grip to a lower edge of the functional part, so that the breakable portion has a substantially U shape as viewed from the vehicle inner side.

3. The head-protecting airbag device according to claim 2, wherein:
    more than one assist grip are located along front-rear direction of the vehicle, and
    the functional part is located in at least one of the assist grips.

4. The head-protecting airbag device according to claim 2, wherein the airbag cover is constituted by a roof side rail garnish arranged along front-rear direction in a band shape in a roof side rail of the vehicle between the side windows and a roof head lining, separately from the roof head lining.

5. The head-protecting airbag device according to claim 4, wherein the airbag cover is constructed of more than one part split up in the front-rear direction of the vehicle.

6. The head-protecting airbag device according to claim 2, wherein the airbag cover is a part of a roof head lining.

7. The head-protecting airbag device according to claim 1, wherein the airbag cover is constituted by a roof side rail garnish arranged along front-rear direction in a band shape in a roof side rail of the vehicle between the side windows and a roof head lining, separately from the roof head lining.

8. The head-protecting airbag device according to claim 7, wherein the airbag cover is constructed of more than one part split up in the front-rear direction of the vehicle.

9. The head-protecting airbag device according to claim 1, wherein the airbag cover is a part of a roof head lining.

* * * * *